(12) United States Patent
Roeda

(10) Patent No.: US 11,391,336 B2
(45) Date of Patent: Jul. 19, 2022

(54) ISOLATOR ASSEMBLY

(71) Applicant: Vibracoustic USA, Inc., South Haven, MI (US)

(72) Inventor: Tristan J. Roeda, South Haven, MI (US)

(73) Assignee: Vibracoustic USA, Inc., South Haven, MI (US)

( * ) Notice: Subject to any disclaimer, the term of this patent is extended or adjusted under 35 U.S.C. 154(b) by 0 days.

(21) Appl. No.: 16/439,826

(22) Filed: Jun. 13, 2019

(65) Prior Publication Data

US 2019/0383344 A1    Dec. 19, 2019

Related U.S. Application Data

(60) Provisional application No. 62/689,441, filed on Jun. 25, 2018, provisional application No. 62/685,363, filed on Jun. 15, 2018.

(51) Int. Cl.
  *F16F 1/38*  (2006.01)
  *F16F 15/08*  (2006.01)

(52) U.S. Cl.
  CPC .......... *F16F 1/3849* (2013.01); *F16F 1/3814* (2013.01); *F16F 15/085* (2013.01); *F16F 2228/06* (2013.01)

(58) Field of Classification Search
  CPC ...... F16F 7/108; F16F 2222/08; F16F 15/085; F16F 1/3849; F16F 1/3814
  See application file for complete search history.

(56) References Cited

U.S. PATENT DOCUMENTS

| 5,766,720 A * | 6/1998 | Yamagishi | F16F 1/37 |
| | | | 428/119 |
| 5,984,233 A * | 11/1999 | Snyder, Jr. | F16F 7/108 |
| | | | 188/379 |
| 6,499,730 B1 * | 12/2002 | Kuwayama | F16F 7/108 |
| | | | 188/379 |
| 8,474,804 B2 * | 7/2013 | Masterson | F16F 15/08 |
| | | | 267/141 |

(Continued)

FOREIGN PATENT DOCUMENTS

| CN | 106979270 A | 7/2017 |
| CN | 107218345 A | 9/2017 |

(Continued)

OTHER PUBLICATIONS

European Search Report EP19180492.1, dated Nov. 28, 2019.

(Continued)

*Primary Examiner* — Nishal R Sahni
(74) *Attorney, Agent, or Firm* — Fishman Stewart PLLC

(57) ABSTRACT

An isolator assembly includes a bracket, a first isolator connected to the bracket, a second isolator connected to the bracket, and/or a mass connected to the bracket via the first isolator and the second isolator. The first isolator and the second isolator may include a plurality of legs. The first isolator may include a first radial flange and a second radial flange. The first radial flange and the second radial flange may be axially spaced from each other. An outer diameter of the first radial flange may be larger than an outer diameter of the second radial flange. A distance between the first radial flange and the second radial flange may correspond to a thickness of the bracket.

19 Claims, 29 Drawing Sheets

(56) References Cited

U.S. PATENT DOCUMENTS

| | | | |
|---|---|---|---|
| 9,689,454 B2* | 6/2017 | Gustavsson | F16F 1/3732 |
| 9,920,813 B2 | 3/2018 | Kim | |
| 10,302,171 B2 | 5/2019 | Kim | |
| 10,598,245 B2* | 3/2020 | Sohn | F16F 7/108 |
| 2007/0063401 A1* | 3/2007 | Rodecker | F16F 1/373 |
| | | | 267/141 |
| 2008/0237949 A1* | 10/2008 | Hasegawa | F16F 7/108 |
| | | | 267/140 |
| 2009/0315235 A1* | 12/2009 | Rodecker | F16F 1/3849 |
| | | | 267/294 |
| 2018/0274619 A1* | 9/2018 | Gebhardt | F16F 7/108 |
| 2019/0186577 A1* | 6/2019 | Back | F16F 7/108 |
| 2020/0278007 A1 | 9/2020 | Gustavsson | |

FOREIGN PATENT DOCUMENTS

| | | |
|---|---|---|
| CN | 108019454 A | 5/2018 |
| CN | 109630603 A | 4/2019 |
| DE | 102016115782 A1 | 3/2018 |
| DE | 102017106019 A1 | 9/2018 |
| EP | 3467334 A1 | 4/2019 |
| JP | H09184538 A | 7/1997 |

OTHER PUBLICATIONS

CN Search Report, 201910523990.X, dated Sep. 18, 2020.
Translation CN Office Action, 201910523990.X, dated Sep. 30, 2020.
Office Action, 201910523990.X, dated Sep. 30, 2020 (in Chinese).
Chinese Search Report, 201910523990X, dated Mar. 5, 2021.
Chinese Second Office Action, 201910523990.X, dated Mar. 12, 2021.
Translation of Chinese Second Office Action, 201910523990.X, dated Mar. 12, 2021.

* cited by examiner

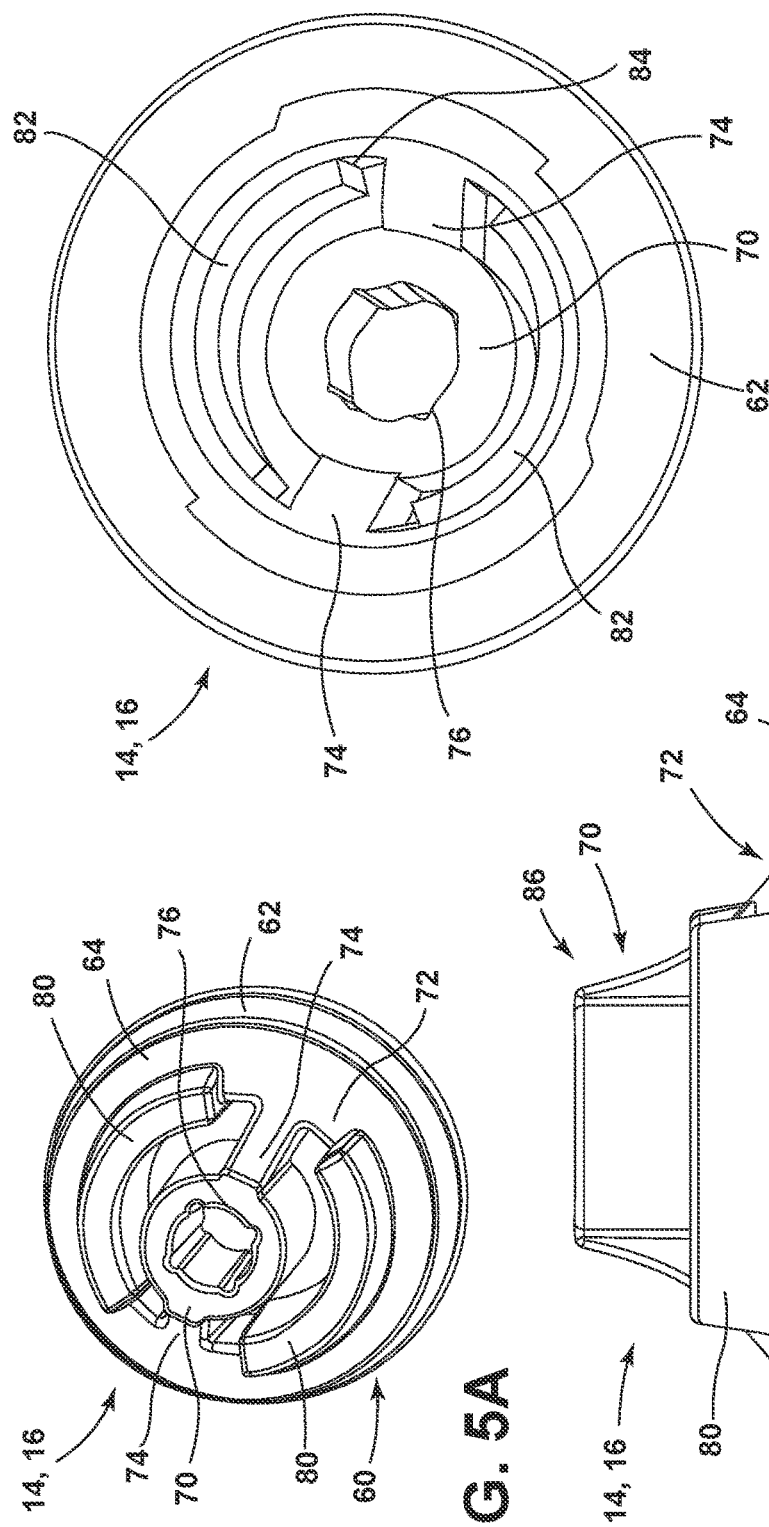
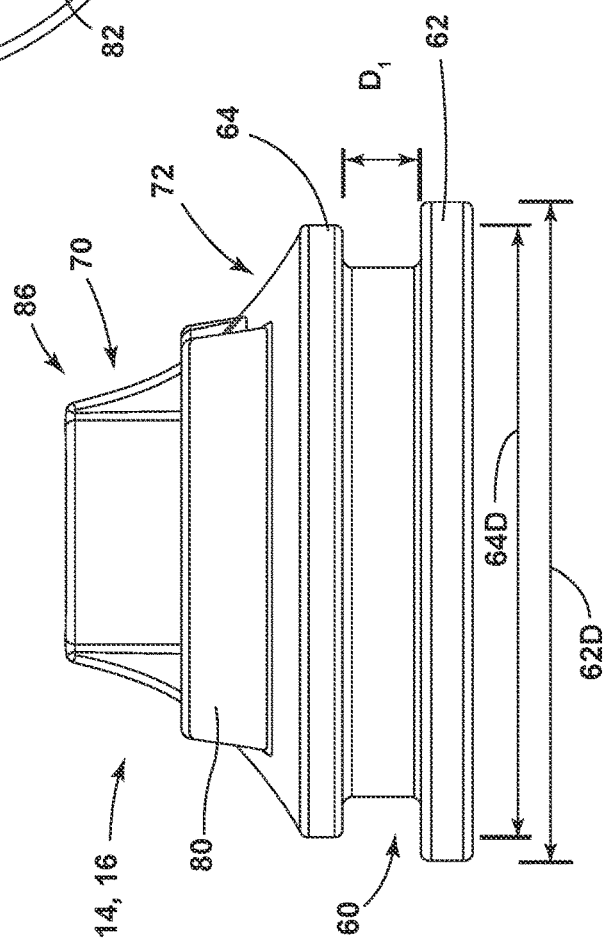
FIG. 5A
FIG. 5B
FIG. 5C

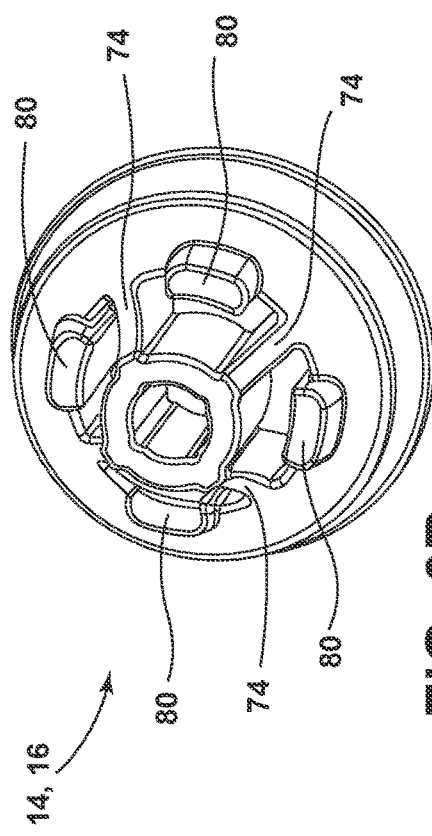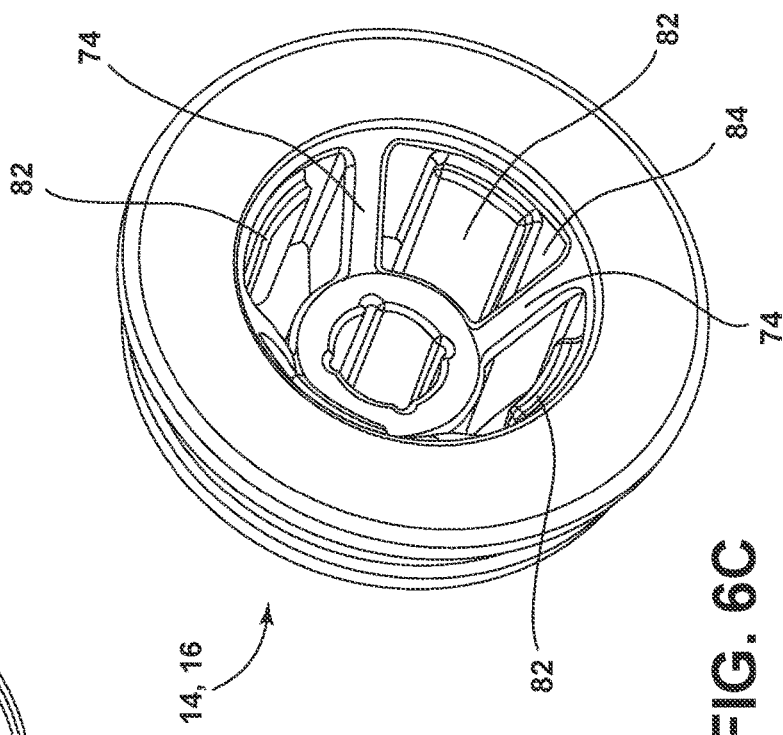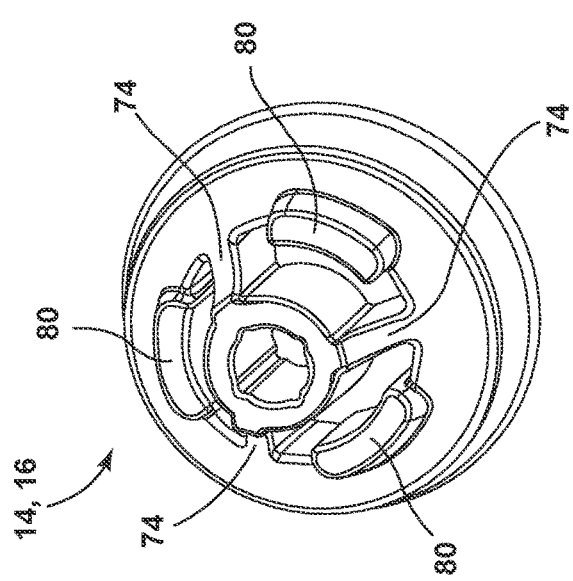

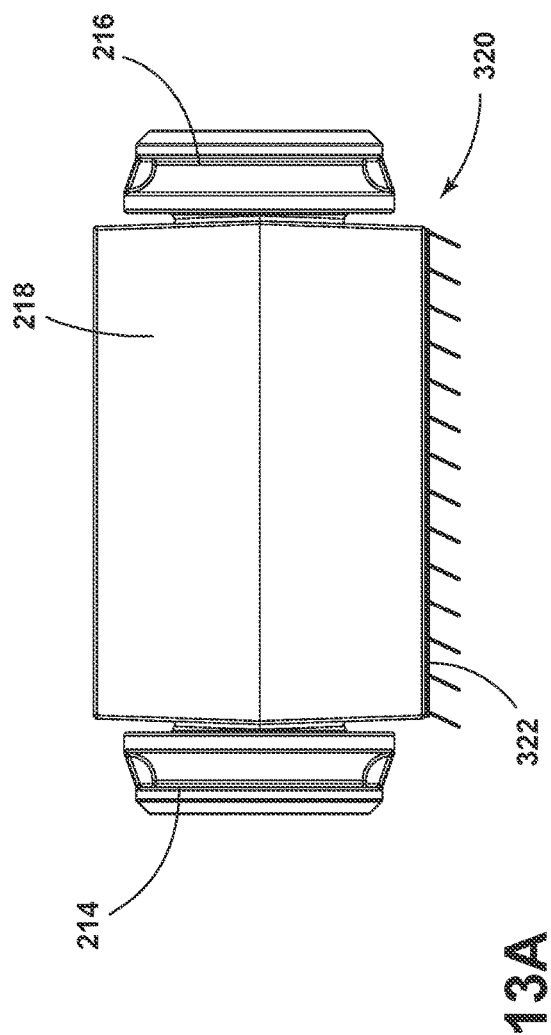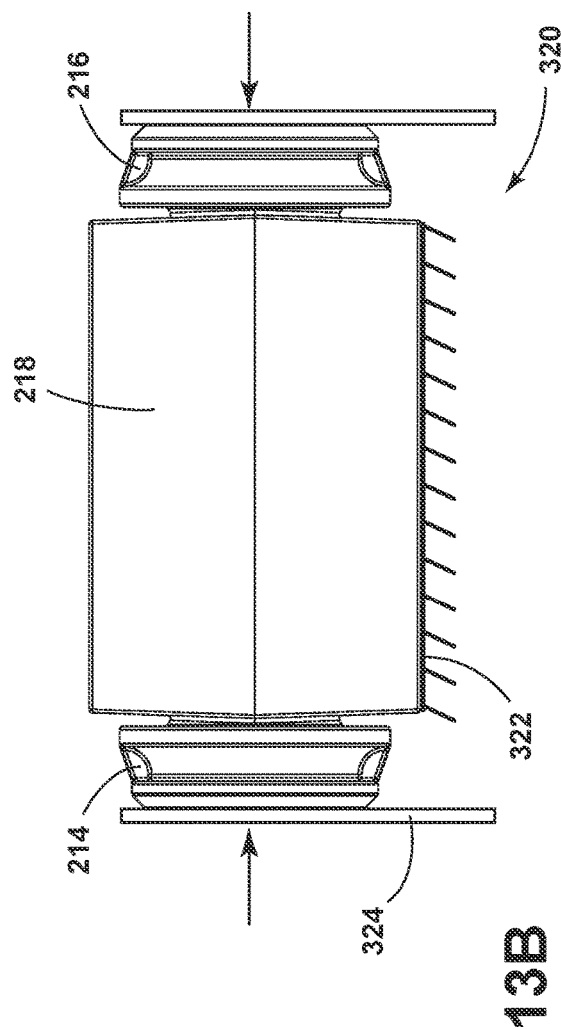

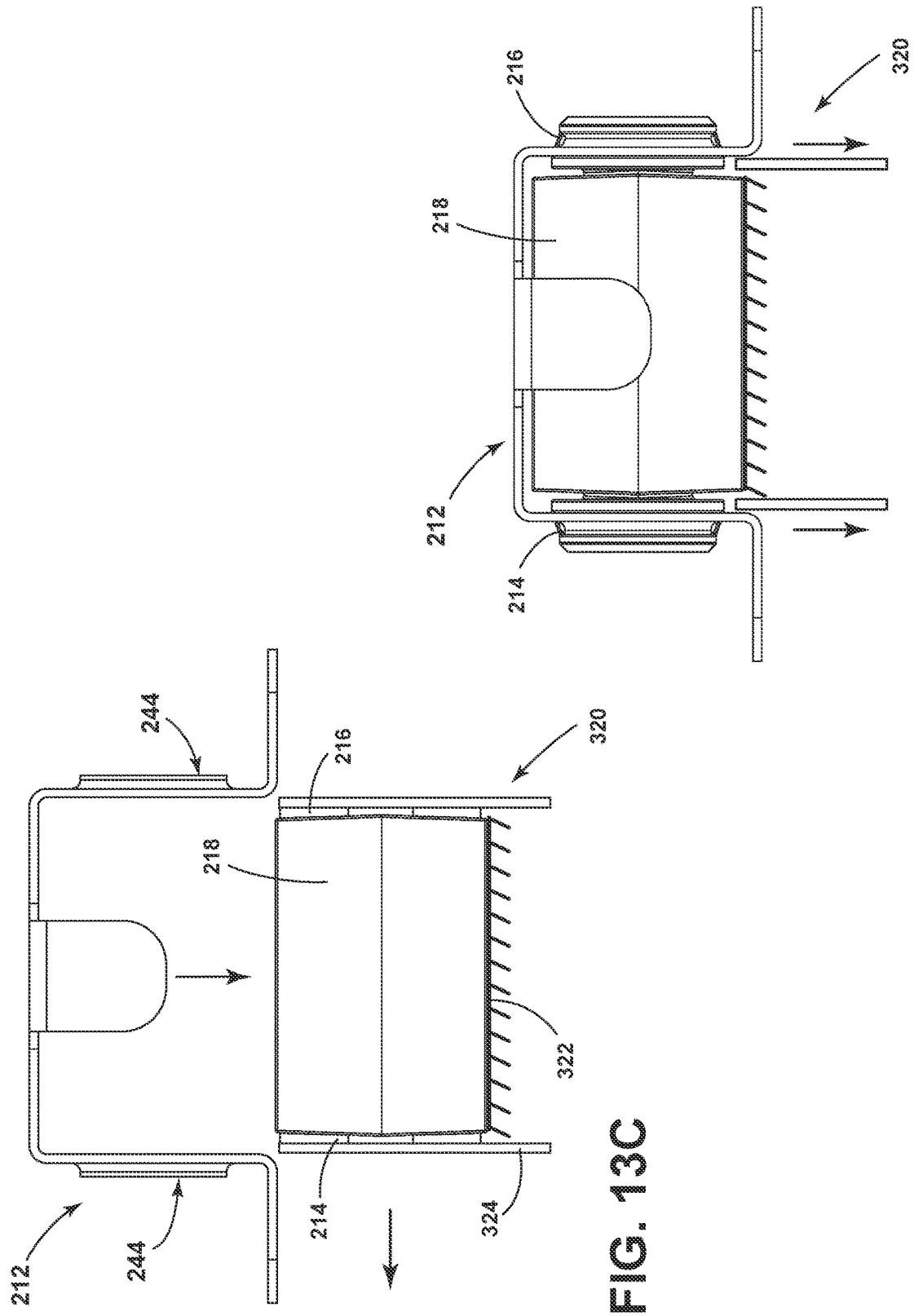

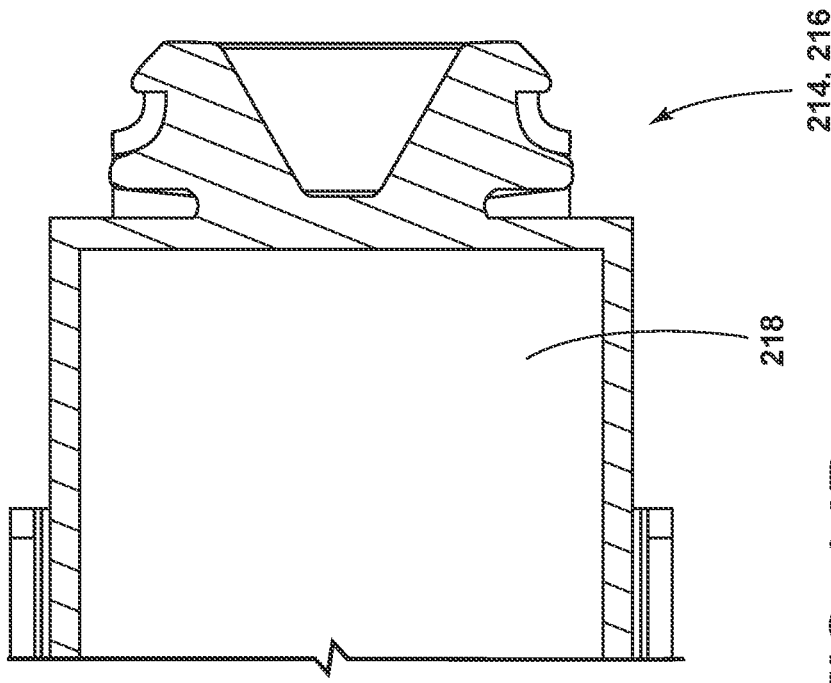
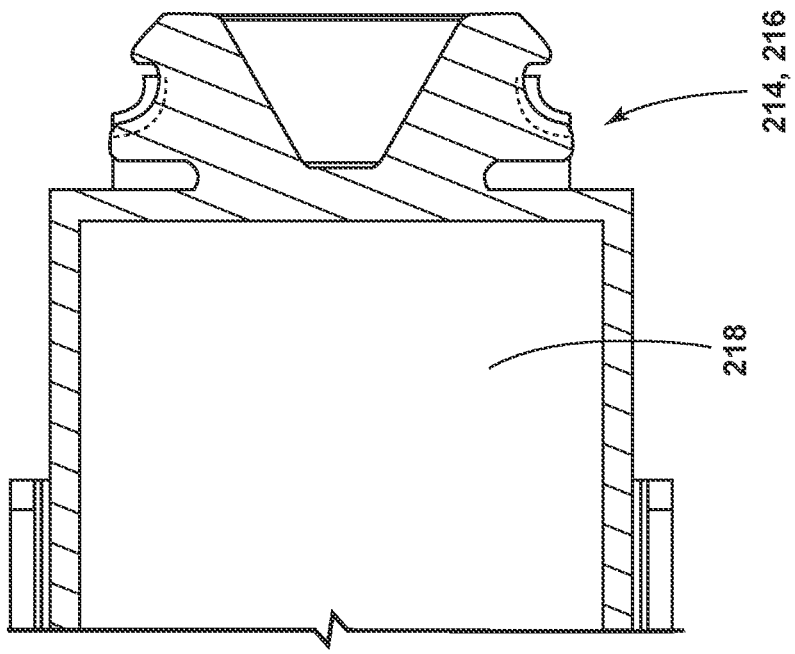

ISOLATOR ASSEMBLY

CROSS-REFERENCE TO RELATED APPLICATION

This application claims the benefit of U.S. Provisional Patent Application Ser. No. 62/685,363, filed on Jun. 15, 2018, and U.S. Provisional Patent Application Ser. No. 62/689,441, filed on Jun. 25, 2018, the disclosures of which are hereby incorporated herein by reference in their entireties.

TECHNICAL FIELD

The present disclosure generally relates to damping and isolator assemblies, including isolator assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some damping or isolating designs do not adequately damp or isolate vibration, and/or may not be configured for use with certain frequencies.

There is a desire for solutions/options that minimize or eliminate one or more challenges or shortcomings of damping and isolator assemblies. The foregoing discussion is intended only to illustrate examples of the present field and should not be taken as a disavowal of scope.

SUMMARY

In embodiments, an isolator assembly may include a bracket, a first isolator connected to the bracket, a second isolator connected to the bracket, and/or a mass connected to the bracket via the first isolator and the second isolator. The first isolator and the second isolator may include a plurality of legs. The first isolator may include a first radial flange and a second radial flange. The first radial flange and the second radial flange may be axially spaced from each other. An outer diameter of the first radial flange may be larger than an outer diameter of the second radial flange. A distance between the first radial flange and the second radial flange may correspond to a thickness of the bracket. The second radial flange may be configured for insertion into an aperture of the bracket and/or to increase a removal force of the first isolator from the bracket. The first radial flange may be configured to limit an insertion depth of the first isolator into the aperture. An outer diameter of the second radial flange is greater than an inner diameter of the aperture. The bracket may include a tab. The tab may include the aperture. The aperture may be offset from a center of the tab.

With embodiments, the first isolator includes an inner portion and an outer portion connected to each other via a plurality of support members. A number of support members of the plurality of support members may be equal to a number of legs of the plurality of legs. The inner portion may extend axially beyond the outer portion toward the mass. At least two legs of the plurality of legs may extend from the outer portion of the first isolator toward the mass. The at least two legs may include portions disposed at an inner surface of the outer portion. The plurality of legs may extend substantially in an axial direction toward the mass. At least one of the plurality of legs may include an arcuate configuration. A number of legs of the plurality of legs may correspond to a desired frequency behavior. The plurality of legs may be configured to limit movement of the mass relative to the bracket.

In embodiments, a first isolator may include an inner portion and an outer portion connected to each other via an elastomeric membrane. A first isolator may be formed separately from the mass. A cross-sectional shape of the first isolator may be substantially circular or may be rectangular. The first isolator may include a first side having a first length and a second side having a second length. The first length may correspond to a first frequency. The second length may correspond to a second frequency. The first length may be different than the second length and/or the first frequency and the second frequency may be different.

In embodiments, a method of assembling an isolator assembly may include providing a first isolator, a second isolator, a bracket, a first pin, a second pin, and a mass, connecting the bracket with an assembly fixture, connecting the mass with the assembly fixture, connecting the first isolator with a press, connecting the second isolator with the press, inserting the first isolator and the second isolator into respective apertures of the bracket via the press, inserting the first pin into the first isolator and a first end of the mass, and/or inserting the second pin into the second isolator and a second end of the mass. Inserting the first isolator and the second isolator into respective apertures may include (i) inserting a first radial flange of the first isolator and a first radial flange of the second isolator into the respective apertures, and/or (ii) limiting insertion via a second radial flange of the first isolator and a second radial flange of the second isolator. After inserting the first isolator and the second isolator into the respective apertures, a first portion of the bracket may be disposed partially between the first radial flange and the second radial flange of the first isolator, and/or a second portion of the bracket may be disposed partially between the first radial flange and the second radial flange of the second isolator. The first isolator and the second isolator may each include a plurality of legs configured to limit movement of the mass relative to the bracket. A number of legs of the plurality of legs may correspond to a desired frequency behavior of the isolator assembly.

With embodiments, an isolator assembly may include a bracket, a first isolator connected to the bracket having an aperture, a second isolator connected to the bracket, and/or a mass connected to the bracket via the first isolator and the second isolator. The first isolator and the second isolator may be integrally formed with the mass. The first isolator may include a radial flange. An outer diameter of the radial flange may be larger than an inner diameter of the aperture.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIGS. 5A and 5B are perspective views generally illustrating embodiments of isolators according to teachings of the present disclosure.

FIG. 5C is a side view generally illustrating an embodiment of an isolator according to teachings of the present disclosure.

FIGS. 6A, 6B, and 6C are perspective views generally illustrating embodiments of isolators according to teachings of the present disclosure.

FIGS. 13A-13E generally illustrate an embodiment of a method of assembling an embodiment of an isolator assembly according to teachings of the present disclosure.

FIGS. 14A and 14B are cross-sectional views generally illustrating portions of embodiments of a mass and an isolator before assembly and after assembly, respectively.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
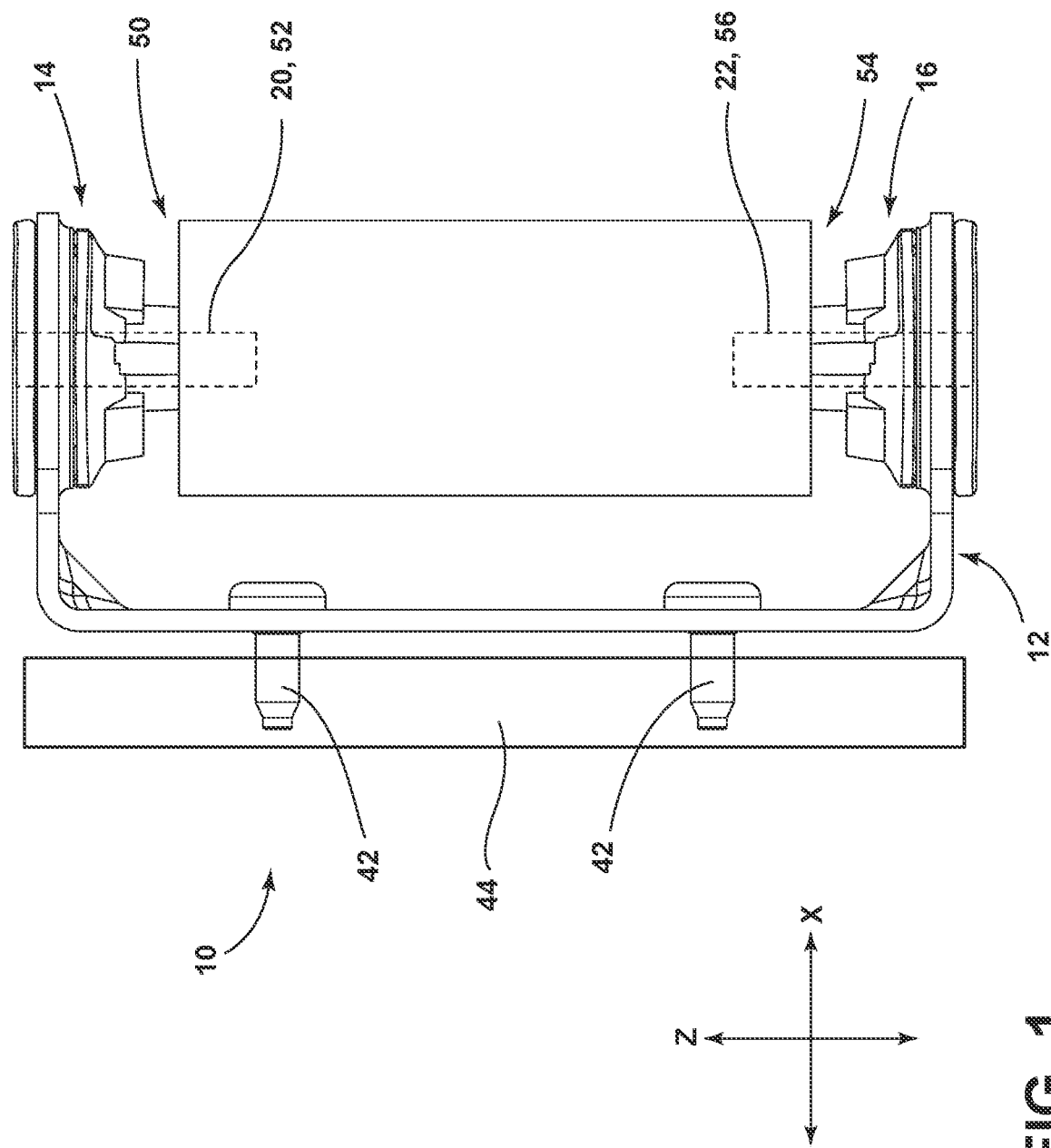
FIG. 1 is a side view generally illustrating an embodiment of an isolator assembly according to teachings of the present disclosure.
Figure 2:
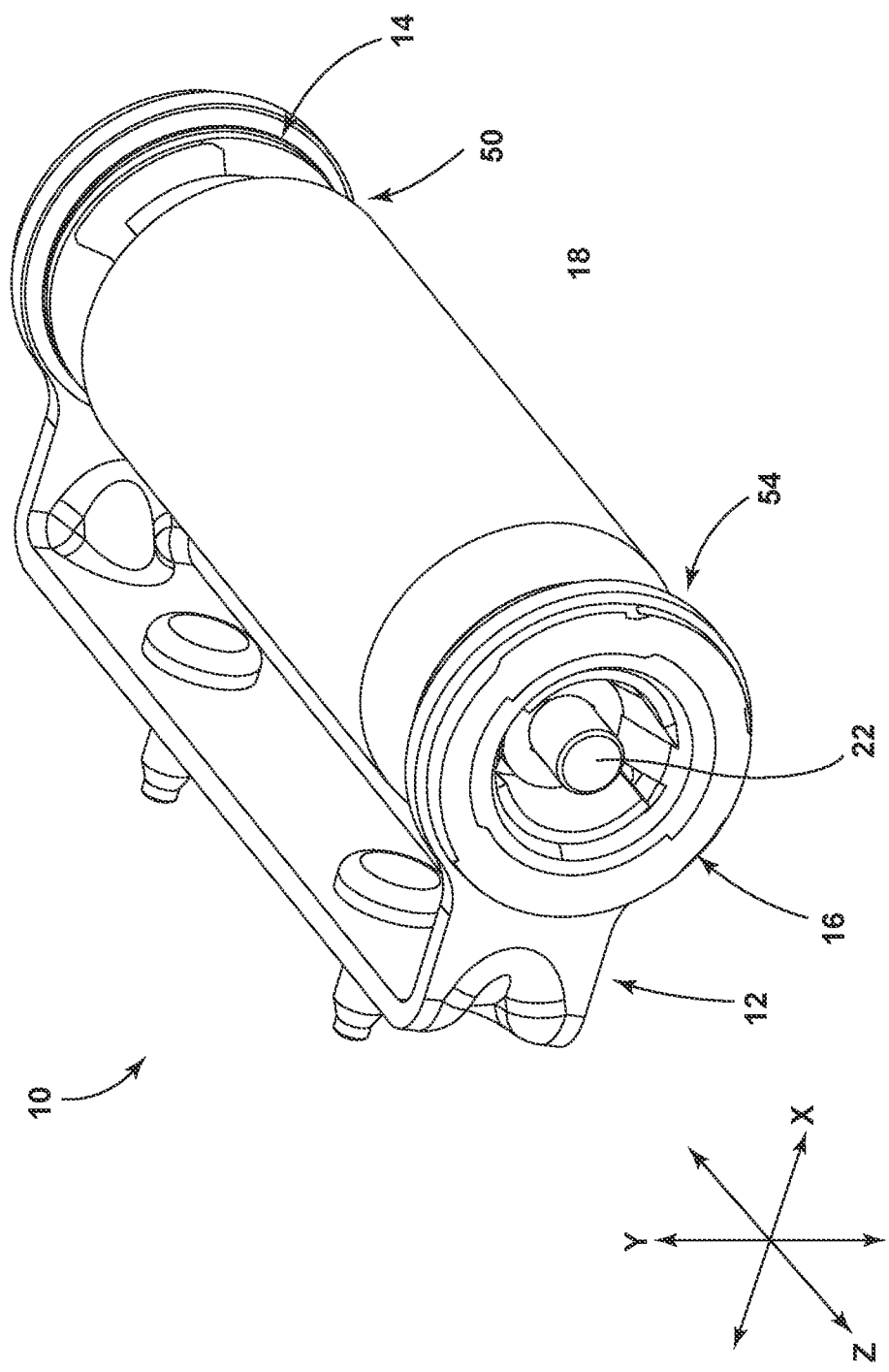
FIG. 2 is a perspective view generally illustrating an embodiment of an isolator assembly according to teachings of the present disclosure.

In embodiments, such as generally illustrated in FIGS. 1 and 2, an isolator assembly 10 may include a bracket 12, a first isolator 14, a second isolator 16, a mass 18, a first pin 20, and/or a second pin 22. The mass 18 may be connected to the bracket 12 via the first isolator 14, the second isolator 16, the first pin 20, and/or the second pin 22.

Figure 3A:
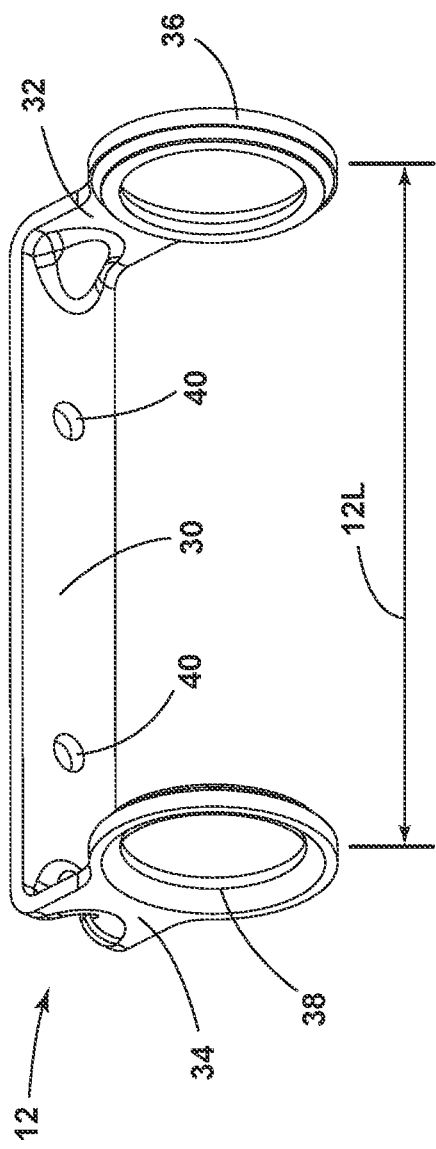
FIGS. 3A and 3B are perspective views generally illustrating embodiments of brackets according to teachings of the present disclosure.
Figure 3B:
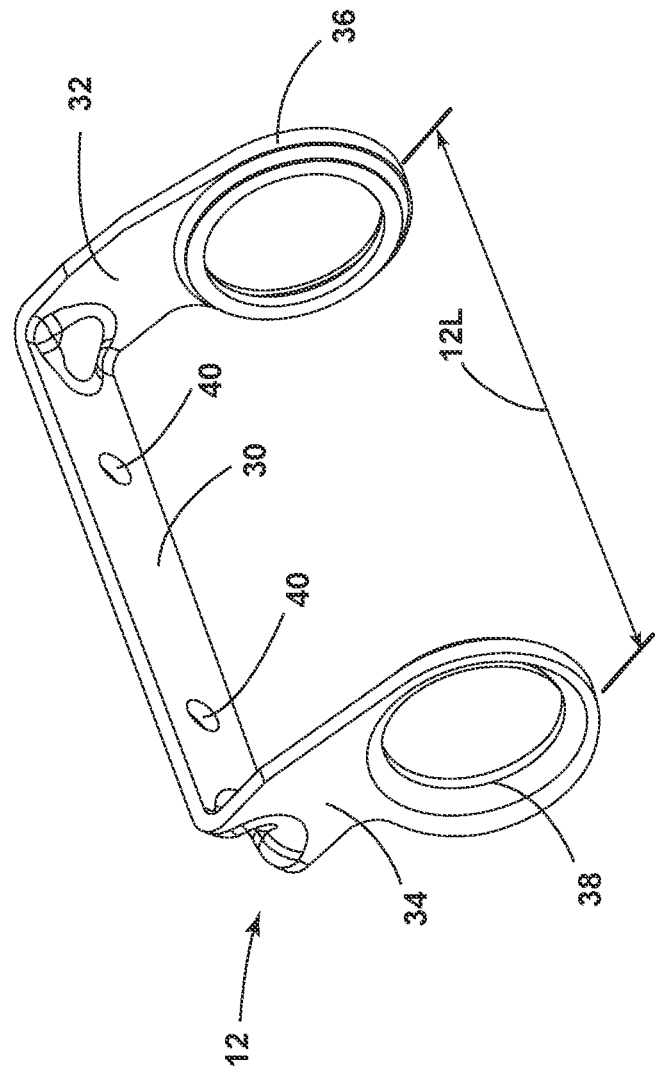

With embodiments, a bracket 12 may include one or more of a variety of shapes, sizes, configurations, and/or materials. As generally illustrated in FIGS. 3A and 3B, for example and without limitation, a bracket 12 may include a generally U-shaped configuration that may include a base 30, a first tab 32, and a second tab 34. The first tab 32 and the second tab 34 may extend (e.g., perpendicularly) from opposite ends of the base 30. The first tab 32 may include a first aperture 36 that may be configured to at least partially receive (or connect with) an isolator (e.g., the first isolator 14). The second tab 34 may include a second aperture 38 that may be configured to at least partially receive an isolator (e.g., the second isolator 16). The apertures 36, 38 may be tapered, at least to some degree. For example and without limitation, diameters of the apertures 36, 38 may be greatest (e.g., about 40 mm) at outer axial ends and may taper inward toward a center of the bracket 12 and/or toward the mass 18 (e.g., to about 30 mm). Tapered apertures may facilitate insertion of isolators 14, 16 into the apertures 36, 38 and/or may increase a removal force involved with removing an inserted isolator 14, 16 from a bracket 12. Apertures 36, 38 may be centered with respect to a tab 32, 34 (see, e.g., FIG. 3A) or apertures 36, 38 may be offset from a center of a tab 32, 34 (see, e.g., FIG. 3B). A bracket 12 may include one or more mounting holes 40 that may be configured to receive (or connect with) one or more fasteners 42 for connecting the bracket 12 and/or the isolator assembly 10 to another component 44, such as a vehicle component or structure (see, e.g., FIG. 1). The isolator assembly 10 may be configured to absorb and/or dampen vibration of the other component 44. A length 12L of a bracket 12 may, for example and without limitation, be about 126 mm.

Figure 4:
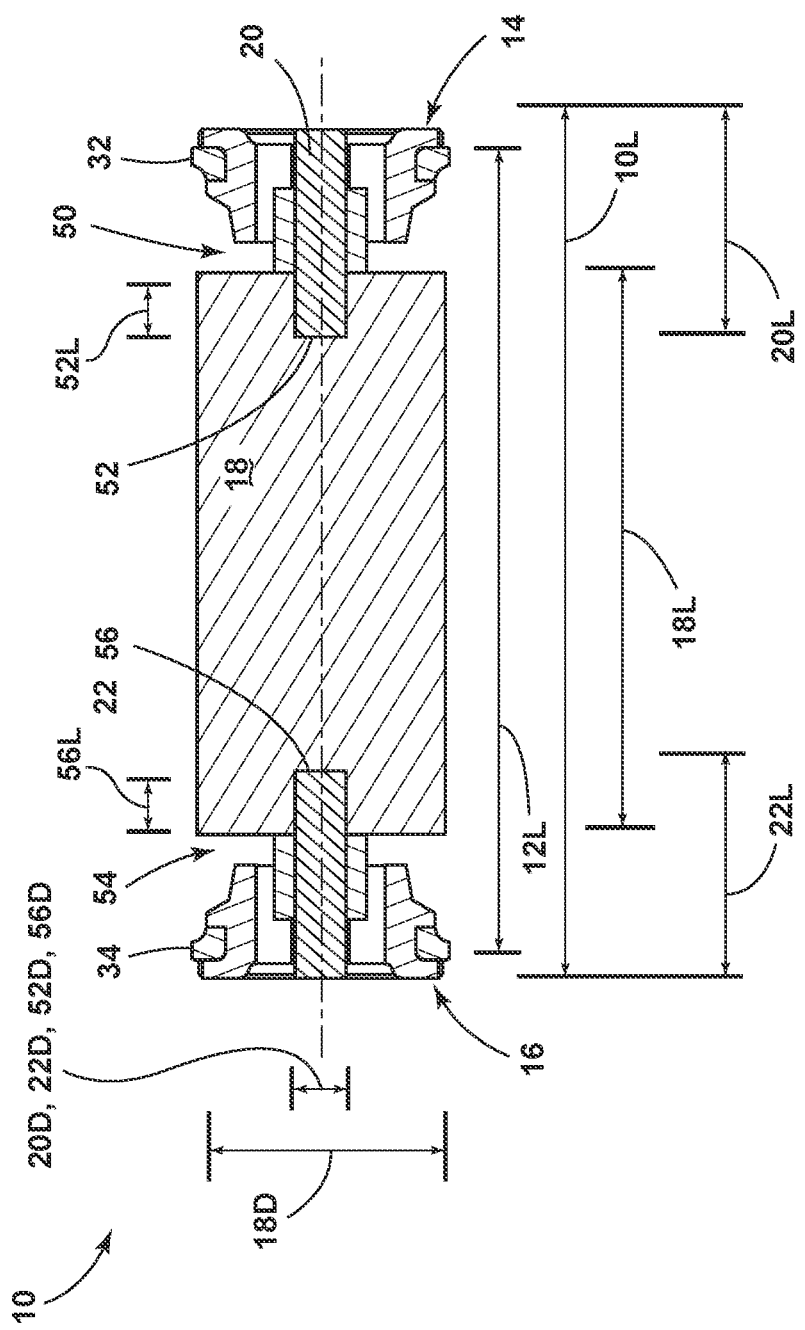
FIG. 4 is a cross-sectional view generally illustrating an embodiment of an isolator assembly according to teachings of the present disclosure.

In embodiments, such as generally illustrated in FIG. 4, in an assembled configuration of an isolator assembly 10, a first end 50 of a mass 18 may be connected to the bracket 12 via the first isolator 14 and the first pin 20. For example and without limitation, the first isolator 14 may be inserted into and/or retained within the first aperture 36 of the first tab 32 of the bracket 12. The first pin 20 may be inserted into the first isolator 14, through the first aperture 36 of the first tab 32, and/or into a recess 52 in the first end 50 of the mass 18. Additionally or alternatively, in an assembled configuration of an isolator assembly 10, a second end 54 of a mass 18 may be connected to the bracket 12 via the second isolator 16 and the second pin 22. For example and without limitation, the second isolator 16 may be inserted into and/or retained within the second aperture 38 of the second tab 34 of the bracket 12. The second pin 22 may be inserted into the second isolator 16, through the second aperture 38 of the second tab 34, and/or into a recess 56 in the second end 54 of the mass 18.

With embodiments, such as generally illustrated in FIGS. 5A, 5B, and 5C, an isolator (e.g., the first isolator 14 and/or the second isolator 16) may include one or more of a variety of shapes, sizes, configurations, and/or materials. An isolator 14, 16 may include a generally round and/or cylindrical configuration. An isolator 14, 16 may include a resilient and/or damping material, such as, for example and without limitation, rubber and/or an elastomer. Isolators 14, 16 may or may not include the same configuration.

An isolator 14, 16 may include a mounting ring 60 that may include a first/outer flange 62 and a second/inner flange 64. The first flange 62 and the second flange 64 may be spaced from each other by a distance $D_1$, such as in an axial direction (e.g., a Z-direction). The distance $D_1$ may correspond to a thickness of a tab 32, 34 of a bracket 12. For example and without limitation, the distance $D_1$ may be about 5 mm and, in an assembled configuration, a tab 32, 34 may be sandwiched between the first flange 62 and the second flange 64. The second flange 64 may be configured for insertion into an aperture 36, 38 of a bracket 12 and/or the first flange 62 may be configured to limit an insertion depth of the isolator 14, 16 into an aperture 36, 38. An outer diameter 62D of the first flange 62 may be larger than an outer diameter 64D of the second flange 64 (see, e.g., FIG.

5C). For example and without limitation, an outer diameter 62D of the first flange 62 may be about 40 mm and/or an outer diameter 64D of the second flange 64 may be about 37 mm (e.g., the first flange 62 may be about 10% larger than the second flange 64).

In embodiments, an isolator 14, 16 may include an inner portion 70 and/or an outer portion 72. The inner portion 70 and/or the outer portion 72 may include a cylindrical configuration. The inner portion 70 and the outer portion 72 may be disposed concentrically. The outer portion 72 may be connected with the inner portion 70 via one or more support members 74 that may extend, generally, in a radially direction out from the inner portion 70 to the outer portion 72. The number of support members 74, the thickness of the support members 74, and/or an angle of the support members 74 may determine, at least in part, a radial stiffness of an isolator assembly 10. The inner portion 70 and the outer portion 72 may overlap, in a radial direction, at least to some degree. Additionally or alternatively, the inner portion 70 may extend axially beyond the outer portion 72, such as toward a mass 18. The outer portion 72 may include the mounting ring 60. The inner portion 70 may include an aperture 76 that may be configured to receive or connect with a pin (e.g., first and second pins 20, 22). For example and without limitation, an aperture 76 may be configured for a press or interference fit with a pin 20, 22.

In embodiments, such as generally illustrated in FIGS. 5A, 5B, and 5C, an isolator 14, 16 may include one or more legs 80 that may extend from an outer portion 72, such as in an axial direction toward a mass 18. An isolator 14, 16 may include two legs 80 that may be disposed opposite each other. In embodiments, a leg 80 may be (or may include portions that are) curved or arcuate. A leg 80 may include a portion 82 that may be disposed at an inner surface 84 of the outer portion 72 (e.g., between the outer portion 72 and the inner portion 70), which may increase an amount of material in or around the mounting ring 60 and/or may facilitate insertion of the isolator 14, 16 into an aperture 36, 38 of a bracket tab 32, 34. In an assembled configuration, the legs 80 may not contact the mass 18. The legs 80 may serve as movement limiters to restrict movement (e.g., excess movement) of a mass 18, such as in the Z-direction (e.g., legs 80 may act as bumpers).

As generally illustrated in FIG. 6A, an isolator 14, 16 may include three legs 80, and, as generally illustrated in FIGS. 6B and 6C, an isolator 14, 16 may include four legs 80. While embodiments are illustrated with two, three, or four legs 80, an isolator 14, 16 may include any number of legs. The number of legs 80 may determine, at least in part, a frequency behavior of an isolator 14, 16 and/or of an isolator assembly 10. For example and without limitation, a 2-leg design may be configured for use with frequencies of about 10 Hz to about 20 Hz, a 3-leg design may be configured for use with frequencies of about 15 Hz to about 30 Hz, and/or a 4-leg design may be configured to use with frequencies of about 30 Hz to about 60 Hz. A 2-leg design may be utilized primarily in single direction applications. A 3-leg or 4-leg design may be tuned radially. The number of support members 74 of an isolator 14, 16 may correspond to the number of legs 80 of the isolator 14, 16. For example and without limitation, an isolator 14, 16 may include the same number of legs 80 and support members 74. The legs 80 may be spaced circumferentially (e.g., equally) about the outer portion 72 and/or the support members 74 may be connected to the outer portion 72 between (e.g., circumferentially) adjacent legs 80. The support members 74 may be equally spaced.

Figure 6D:
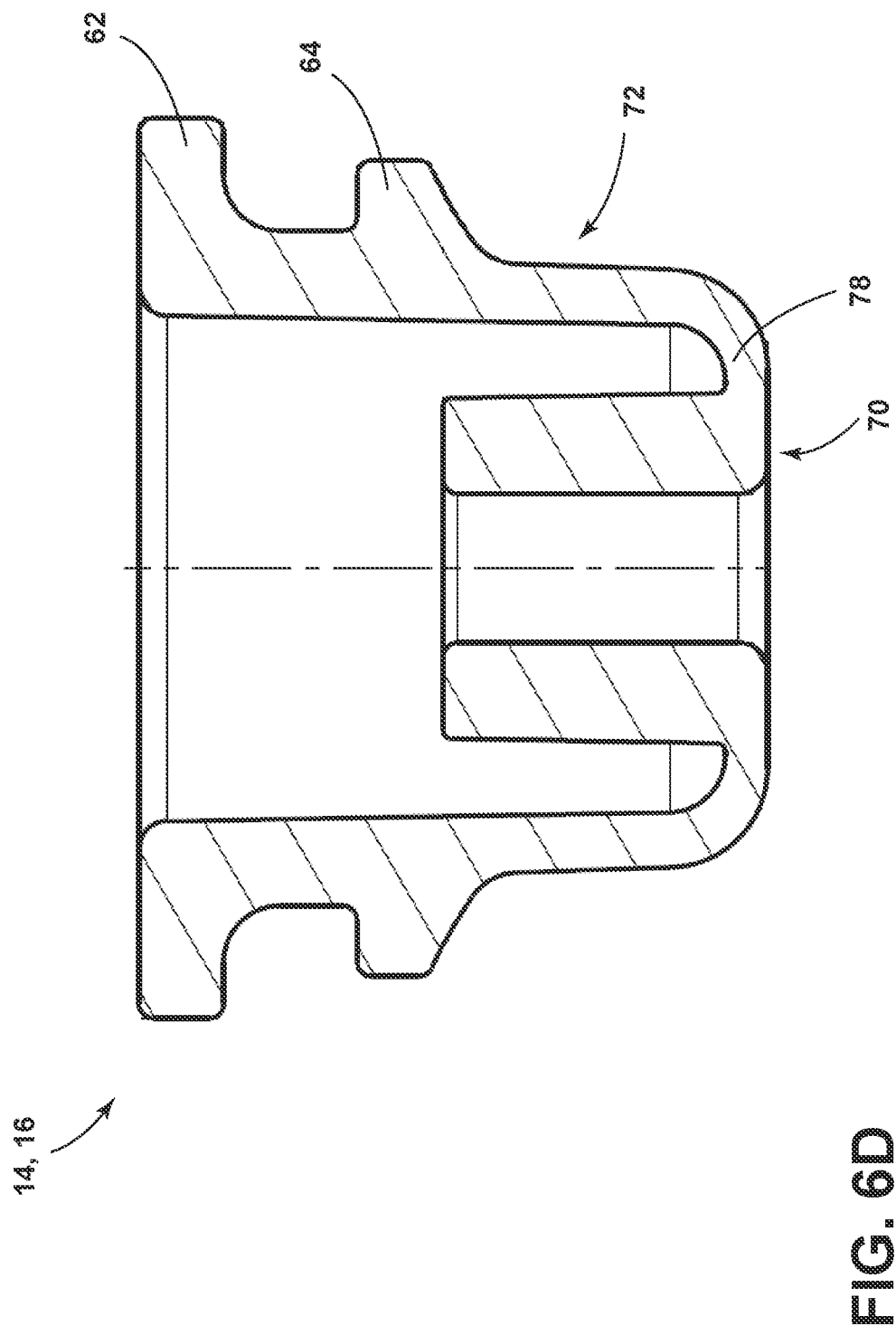
FIG. 6D is a cross-sectional view generally illustrating an embodiment of an isolator according to teachings of the present disclosure.

In embodiments, such as generally illustrated in FIG. 6D, an inner portion 70 may be connected with an outer portion 72 via a membrane 78. The membrane 78 may, for example and without limitation, include a substantially toroidal configuration, may be configured to flex to facilitate relative movement between the inner portion 70 and the outer portion 72 (e.g., between the mass 18 and the bracket 12), and/or may include rubber and/or an elastomeric material.

With embodiments, one or more portions of an isolator 14, 16 may be configured to compress, at least to some degree. For example and without limitation, an isolator 14, 16 may be configured to compress at or about a mounting ring 60, which may include compressing in an axial direction about 5% (or more, or less), and/or compressing in a radial direction about 5% (or more, or less). Additionally or alternatively, an inner portion 70 may be configured to compress, at least to some degree. For example and without limitation, an end 86 of the inner portion 70 may be configured to compress about 0.5 mm to about 1.5 mm and the compression amount may depend on a weight of the mass 18.

With embodiments, such as generally illustrated in FIGS. 1, 2, 4, and 8, the pins 20, 22 and the mass 18 may include one or more of a variety of sizes, shapes, configurations, and/or materials. For example and without limitation, a pin 20, 22 may include a cylindrical configuration, may include lengths 20L, 22L of about 32 mm, and/or may include diameters 20D, 22D of about 8 mm (see, e.g., FIG. 4). A mass 18 may, for example and without limitation, include a cylindrical configuration, have a length 18L of about 87 mm, and/or have a diameter 18D of about 38 mm. The mass 18 may include a first end 50 that may include a first recess 52 that may be configured to at least partially receive (or connect with) a pin (e.g., the first pin 20), such as via a press fit or interference fit. The mass 18 may include a second end 54 that may include a second recess 56 that may be configured to at least partially receive a pin (e.g., the second pin 22), such as via a press fit or interference fit. The first recess 52 and/or the second recess 56 may, for example and without limitation, include a length/depth 52L, 56L of at least about 10 mm and/or may include a diameter 52D, 56D of about 8 mm. An overall length 10L of an assembled isolator assembly 10 may, for example and without limitation, be about 132 mm.

Figure 7:
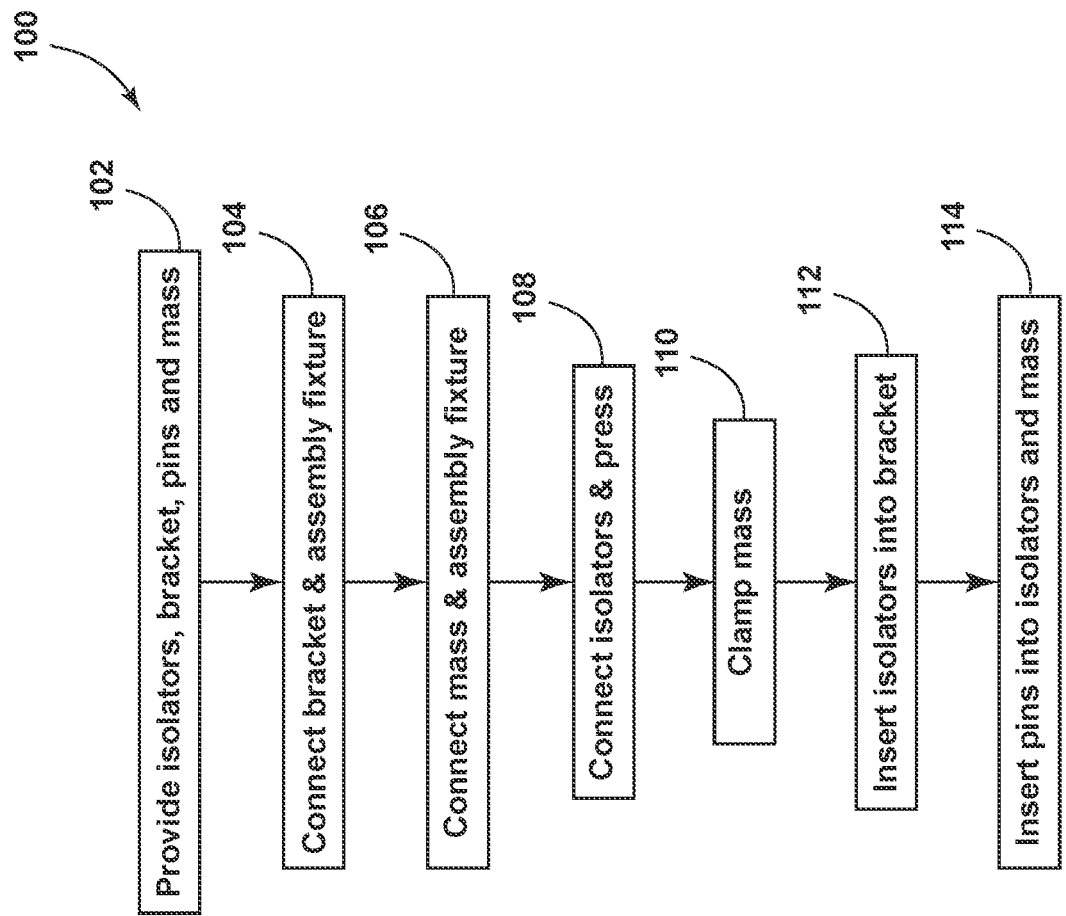
FIG. 7 is a flow diagram of an embodiment of a method of assembling an isolator assembly.
Figure 8:
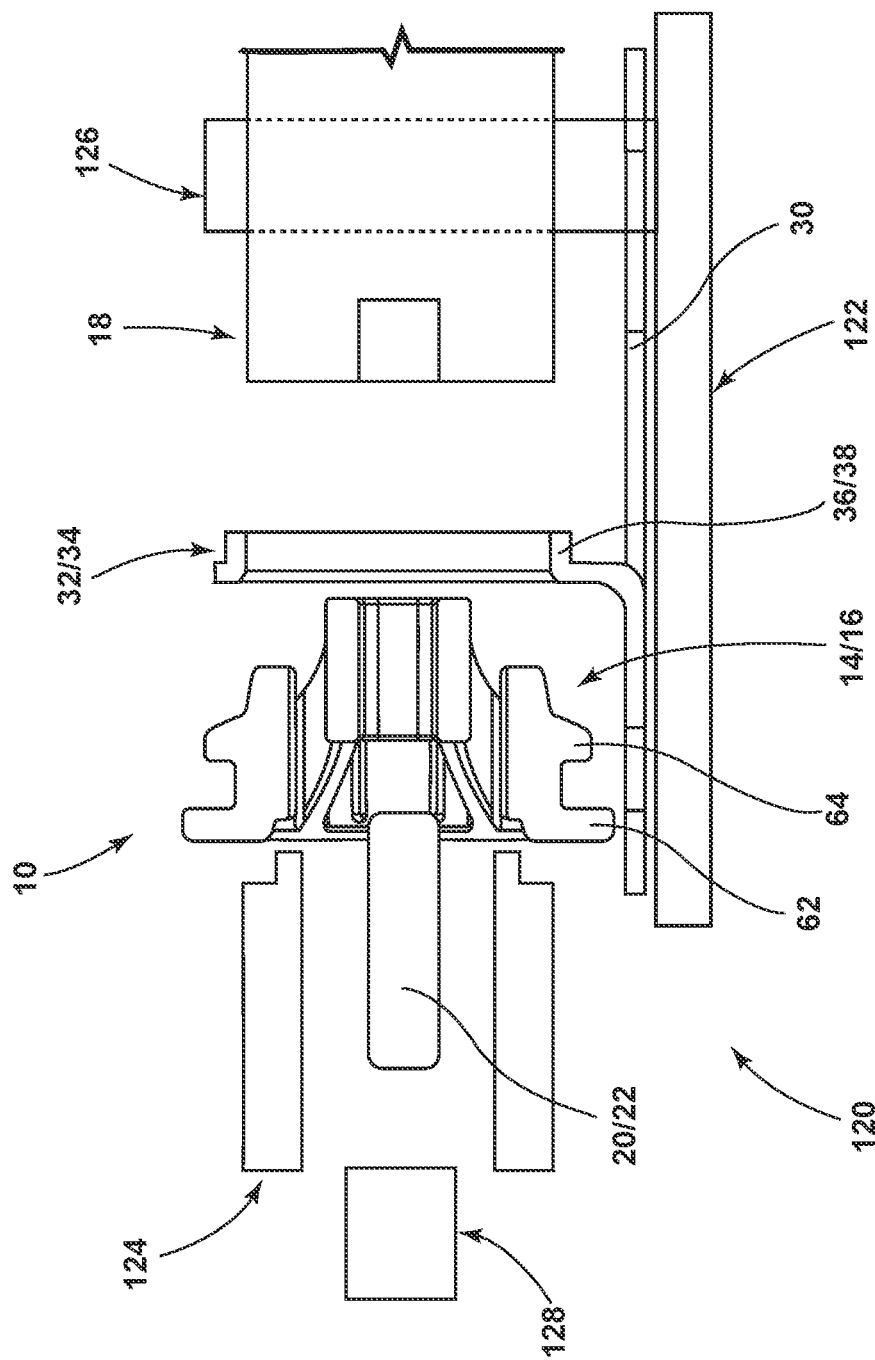
FIG. 8 is a cross-sectional view generally illustrating embodiments of an isolator assembly and an assembly apparatus according to teachings of the present disclosure.

An embodiment of a method 100 of assembling an isolator assembly 10 is generally illustrated in FIG. 7. An embodiment of an assembly apparatus 120 that may be utilized in connection with a method 100 and portions of an isolator assembly 10 are generally illustrated in FIG. 8.

In embodiments, a method 100 of assembly may include providing a bracket 12, a first isolator 14, a second isolator 16, a mass 18, a first pin 20, and/or a second pin 22 (step 102). An embodiment of a method 100 may include connecting the bracket 12 with an assembly fixture 122 of the assembly apparatus 120 (step 104) and/or connecting the mass 18 with the with the assembly fixture 122 (step 106). The isolators 14, 16 may be connected with a press 124 of the assembly apparatus 120 (step 108). A clamp 126 of the assembly apparatus 120 may clamp the mass 18 (e.g., to be centered with respect to tabs 32, 34 of the bracket 12) (step 110). The isolators 14, 16 may be inserted into the apertures 36, 38 of the tabs 32, 34 of the bracket 12, such as via the press 124 (step 112). For example and without limitation, an isolator 14, 16 may be inserted into an aperture 36, 38 of a tab 32, 34 until the second flange 64 snaps through the aperture 36, 38 and/or until the first flange 62 abuts an outer surface of the tab 32, 34. Method 100 may include inserting the pins 20, 22 into the isolators 14, 16 and/or the mass 18, such as via press fits or interference fits (step 114). The pins 20, 22 may be pressed into the isolators 14, 16 and/or the mass 18 via the assembly apparatus 120 (e.g., via a press 128).

Figure 9:
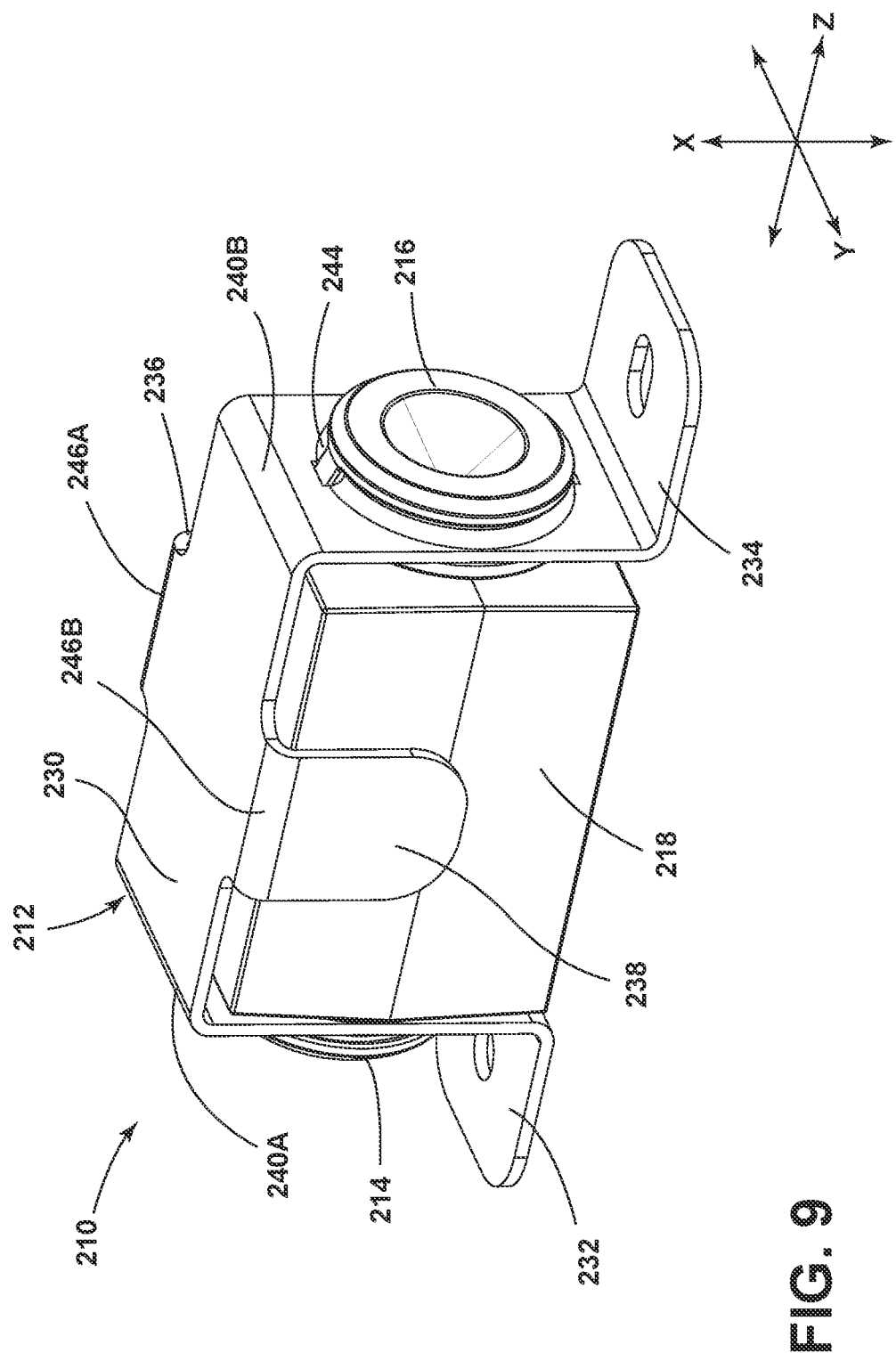
FIGS. 9 and 10 are perspective views generally illustrating embodiments of isolator assemblies according to teachings of the present disclosure.
Figure 10:
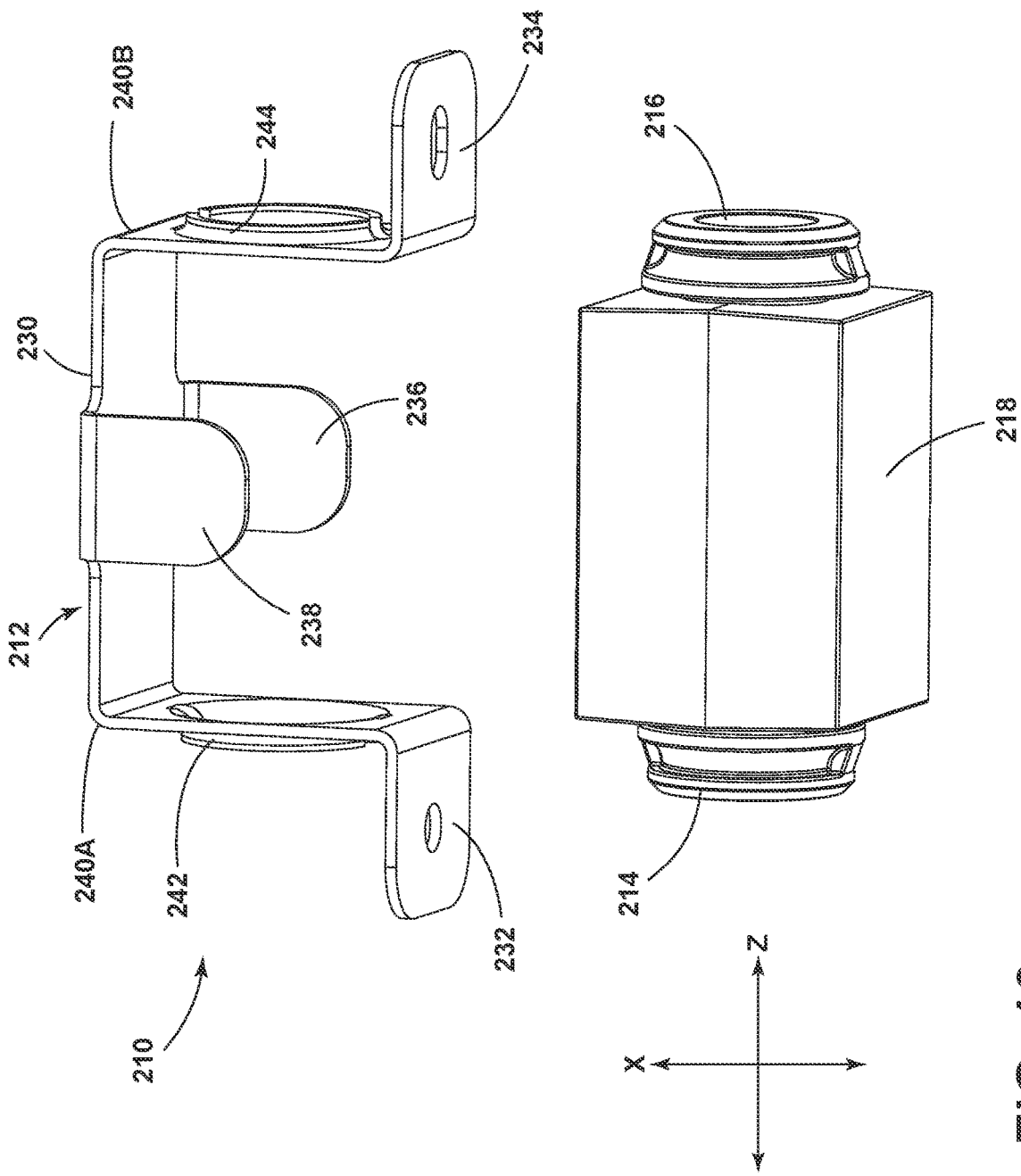

With embodiments, such as generally illustrated in FIGS. 9 and 10, an isolator assembly 210 may include a bracket 212, a first isolator 214, a second isolator 216, and/or a mass 218. The bracket 212 may include a base 230, a first tab 232, a second tab 234, a third tab 236, and/or a fourth tab 238. The base 230, the first tab 232, and the second tab 234 may be disposed in a generally U-shaped configuration, such as with the first tab 232 and the second tab 234 extending (e.g., perpendicularly or substantially perpendicularly) from opposite ends 240A, 240B of the base 230. The first tab 232 may include an aperture 242 and/or the second tab 234 may include a second aperture 244. The aperture 242 of the first tab 232 may be configured for connection with (e.g., to at least partially receive) a first isolator 214 and/or the aperture 244 of the second tab 234 may be configured for connection with (e.g., to at least partially receive) a second isolator 216. The apertures 242, 244 may be tapered, at least to some degree. For example and without limitation, diameters of the apertures 242, 244 may be greatest proximate a center of the bracket 12 and/or the mass 18, and may taper (e.g., radially inward) toward outer axial ends. Tapered apertures may facilitate insertion of the isolators 214, 216 into the apertures 242, 244 and/or may increase a removal force involved with removing an inserted isolator 214, 216 from a bracket 212. Isolators 214, 216 may connect a mass 218 with a bracket 212.

In embodiments, a third tab 236 and/or a fourth tab 238 may extend (e.g., perpendicularly) from the base 230, such as from opposite sides 246A, 246B of the base 230. For example and without limitation, the base 230, the first tab 232, the second tab 234, the third tab 236, and the fourth tab 238 may be disposed in a generally rectangular configuration that may be configured to receive at least portions of a mass 218 and restrict movement of the mass 218. The base 230 may restrict movement of the mass 218 in an X-direction, the first tab 232 and the second tab 234 may restrict movement of the mass 218 in the Z-direction, and/or the third tab 236 and the fourth tab 238 may restrict movement of the mass 218 in the Y-direction.

Figure 11:
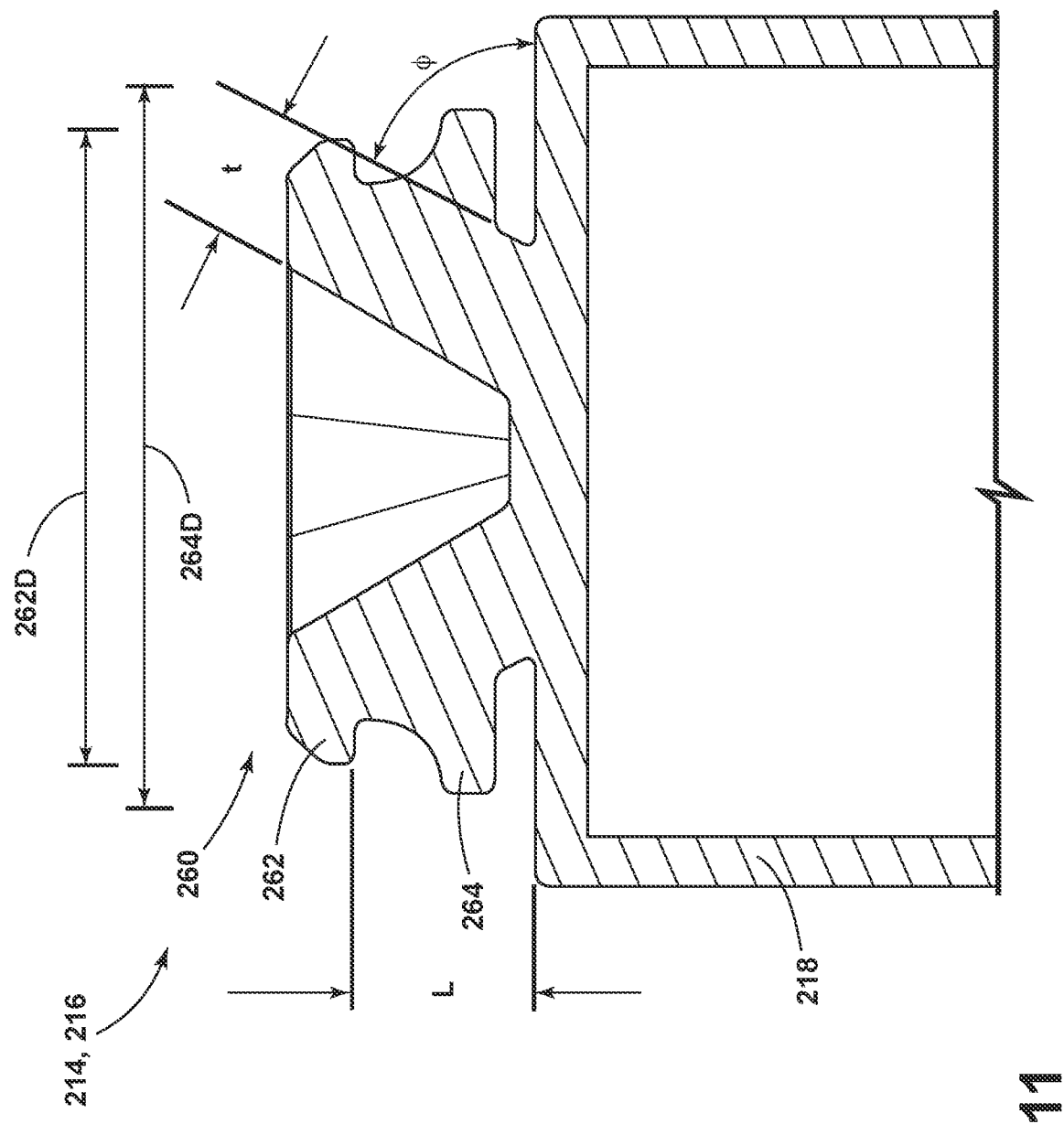
FIGS. 11 and 12 are cross-sectional views generally illustrating embodiments of a reverse isolator and an isolator according to teachings of the present disclosure.

With embodiments, such as generally illustrated in FIGS. 9-11, an isolator 214, 216 (e.g., isolators) may be formed with the mass 218, such as integrally formed with the mass. Pins, such as the pins 20, 22 of the isolator assembly 10, may or may not be used with isolators 214, 216 that are formed with a mass 218. For example and without limitation, the pins 20, 22 may be configured as a back-up of fail-safe connection between isolators 14, 16 and a mass 18 that may prevent the mass 18 from moving freely in the event of a rubber failure. Forming isolators 214, 216 with a mass 218 and/or including a third tab 236 and a fourth tab 238 may substantially prevent such free movement of the mass 218, so pins may not be included.

In embodiments, such as generally illustrated in FIG. 11, an isolator 214, 216 may include a mounting ring 260 that may include a first/outer flange 262 and a second/inner flange 264 that may be axially separated by a distance $D_2$. The second flange 264 may be disposed closer to the mass 218 than the first flange 262. The first flange 262 may include an outer diameter 262D that may be less than an outer diameter 264D of the second flange 264. The first flange 262 may be configured for insertion into an aperture 242, 244 of a tab 232, 234. For example and without limitation, in an assembled configuration, an isolator 214, 216 may be inserted into an aperture 242, 244 such that a tab 232, 234 is retained or sandwiched at least partially between the first flange 262 and the second flange 264.

Figure 12:
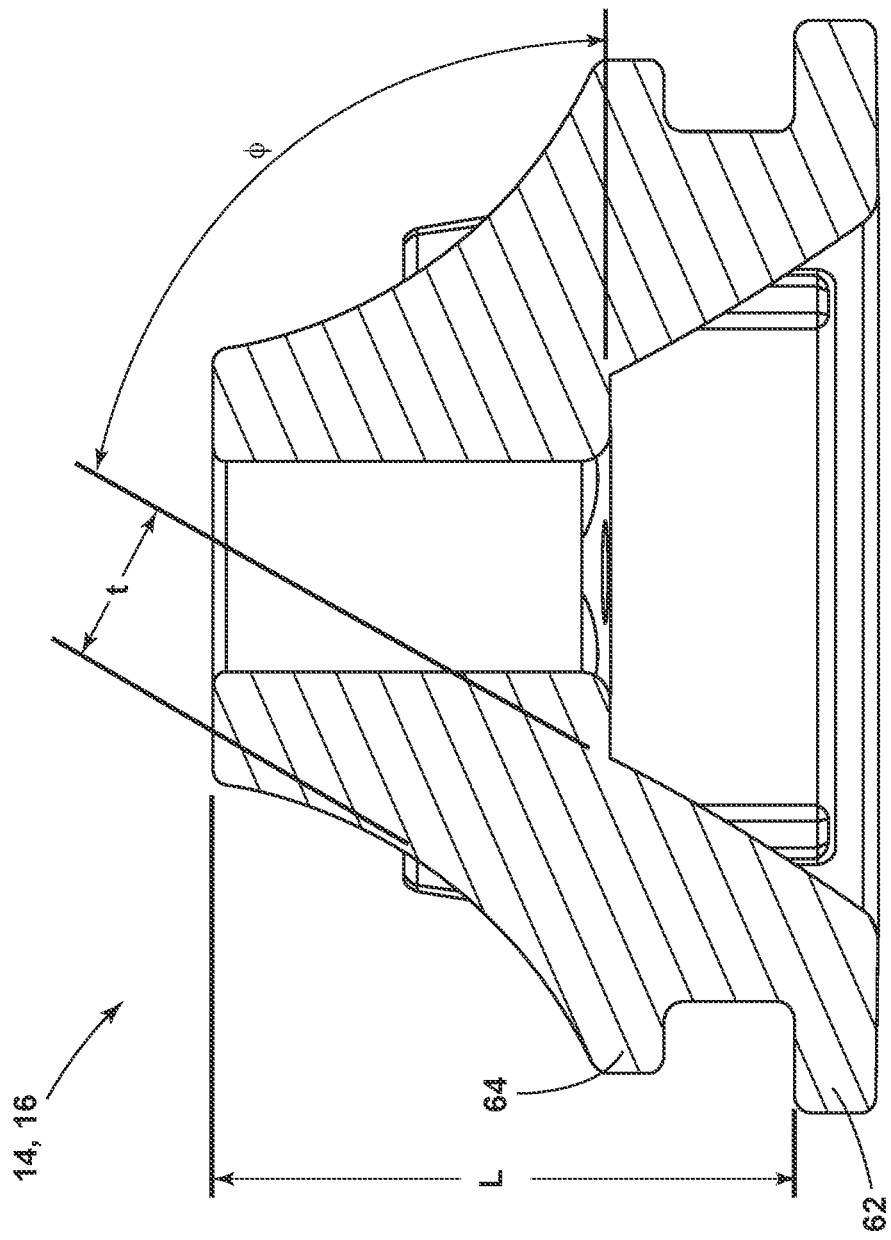

In embodiments, such as generally illustrated in FIGS. 11 and 12, an embodiment of an isolator 214, 216 of an isolator assembly 210 may include at least somewhat of a reverse or mirrored configuration relative to an isolator 14, 16 (e.g., of the isolator assembly 10).

With embodiments, an isolator assembly 10, 210 may be configured for one or more particular applications, which may include modifying a stiffness and/or frequency of an isolator 14, 16, 214, 216. Modifying a stiffness and/or frequency of an isolator 14, 16, 214, 216 may include modifying one or more of a leg length L, a leg thickness t, a leg angle θ, and a preload (mm). An isolator assembly 10, 210 may, for example and without limitation, be configured for frequencies of about 50 Hz to about 150 Hz. A mass 18, 218 may, for example and without limitation, be about 100 g to about 1500 g, and may include steel bar stock.

An isolator assembly 10, 210 may be utilized in connection with one or more of a variety of applications. For example and without limitation, an isolator assembly 10, 210 may be used in connection with vehicles seats, vehicle liftgates, vehicle tailgates, vehicle exhausts, vehicle suspensions, vehicle engine compartments, and/or other vehicle and non-vehicle applications.

Figure 13E:
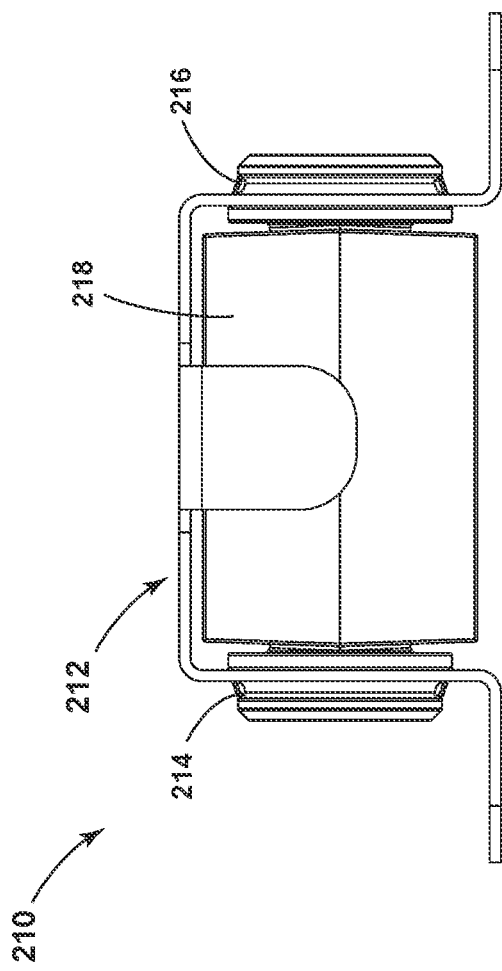

An embodiment of a method of assembling an isolator assembly 210 is generally illustrated in FIGS. 13A-13E. The method may include providing isolators 214, 216 and a mass 218, which may be formed together or the isolators 214, 216 may be connected to the mass 18 (e.g., prior to connecting the isolators 214, 216 to the bracket 212). The mass 218 may be disposed on a surface 322, such as of an assembly apparatus 320 (FIG. 13A). The isolators 214, 216 may be constrained, such as in the Z-direction by a press 324 of the assembly apparatus 320 (FIG. 13B). A bracket 212 may be provided. The bracket 212 may be moved toward the mass 218, such as until the apertures 242, 244 of the first and second tabs 232, 234 are aligned with the first and second isolators 214, 216 (FIGS. 13C and 13D). The press 324 may be moved away (e.g., may slide back) from the mass 218 and/or the isolators 214, 216 may be released to extend into and/or through the apertures 242, 244 (FIG. 13D). The isolators 214, 216 may automatically extend and/or locate into the apertures 242, 244. The isolator assembly 210 may be removed from the surface 322 and/or the assembly apparatus 320, and the method of assembly may be complete (FIG. 13E). In an assembled configuration, an isolator 214, 216 may, for example and without limitation, include a preload of about 1 mm.

Figure 13F:
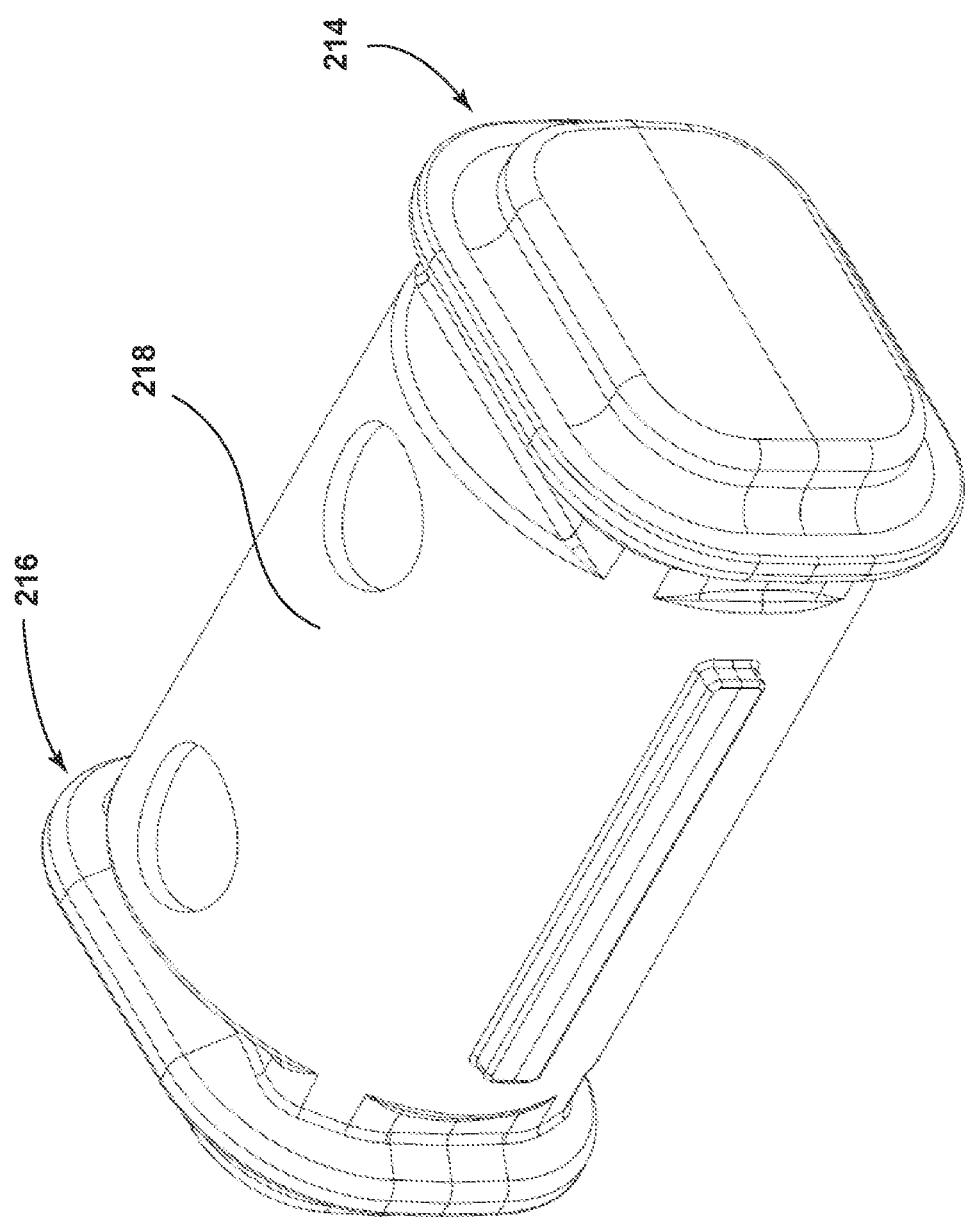
FIG. 13F is a perspective view generally illustrating an embodiment of a mass and isolators of an isolator assembly according to teachings of the present disclosure.
Figure 13G:
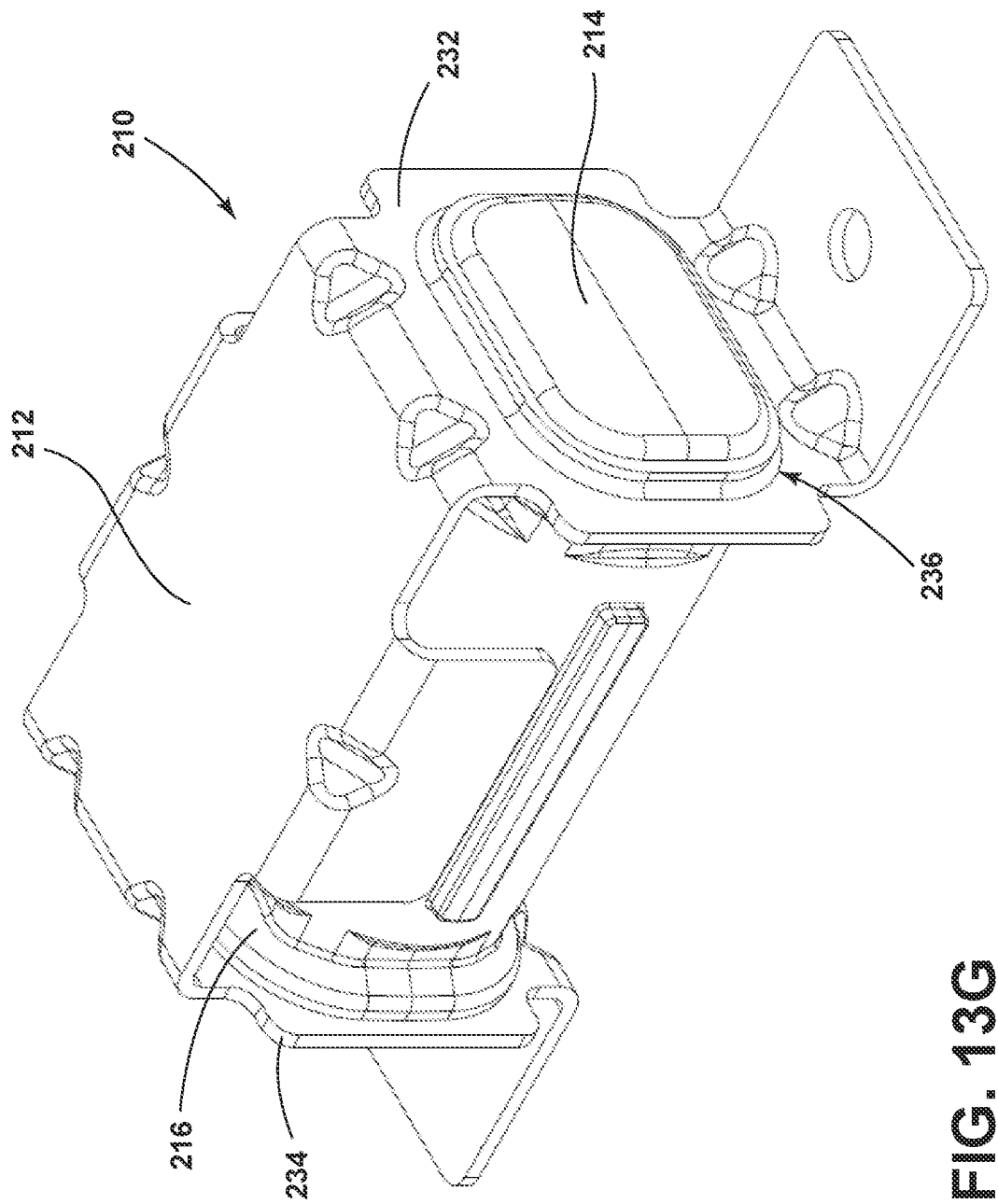
FIG. 13G is a perspective view generally illustrating an embodiment of an isolator assembly according to teachings of the present disclosure.

With embodiments, such as generally illustrated in FIGS. 13F and 13G, the isolators 214, 216 may, for example, include cross-sectional shapes that may be substantially rectangular. The bracket 212 may, for example, include corresponding/respective apertures 244 that may include substantially rectangular shapes. The size of the apertures 244 may be at least slightly smaller than the isolators 214, 216, such as to provide a press or interference fit. The lengths of the sides of the isolators 214, 216 may be different. For example and without limitation, the first isolator may include a first side having a first length and a second side having a second length. The first length may correspond to a first frequency. The second length may correspond to a second frequency. The first frequency and the second frequency may be different.

In embodiments, the isolators 214, 216 may be formed with the mass 218 or may be formed separately from the mass 218 and connected to the mass 218. With embodiments, some isolators (e.g., isolators 214, 216) may not include legs (e.g., legs 80 of isolators 14, 16).

FIGS. 14A and 14B generally illustrate portions of embodiments of a mass 218 and an isolator 214, 216 before assembly and after assembly, respectively.

Figure 15B:
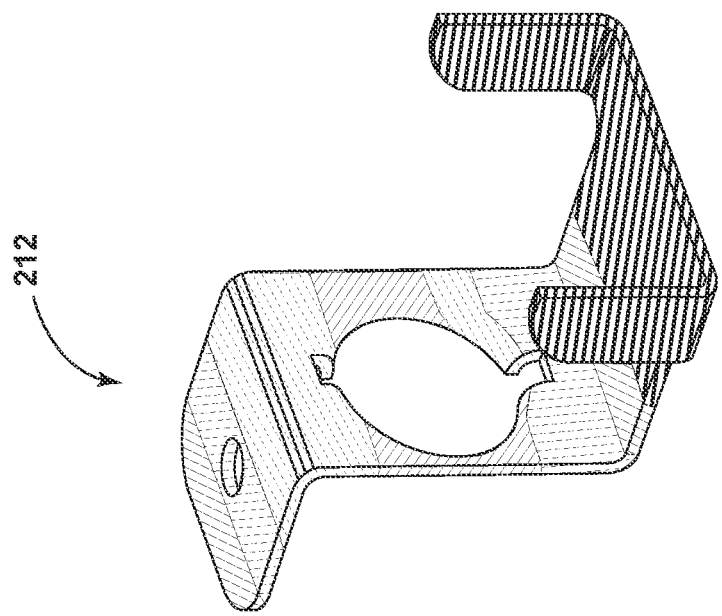
FIGS. 15A-15T include finite element analysis (FEA) images of embodiments of isolator assemblies and portions thereof.
Figure 15A:
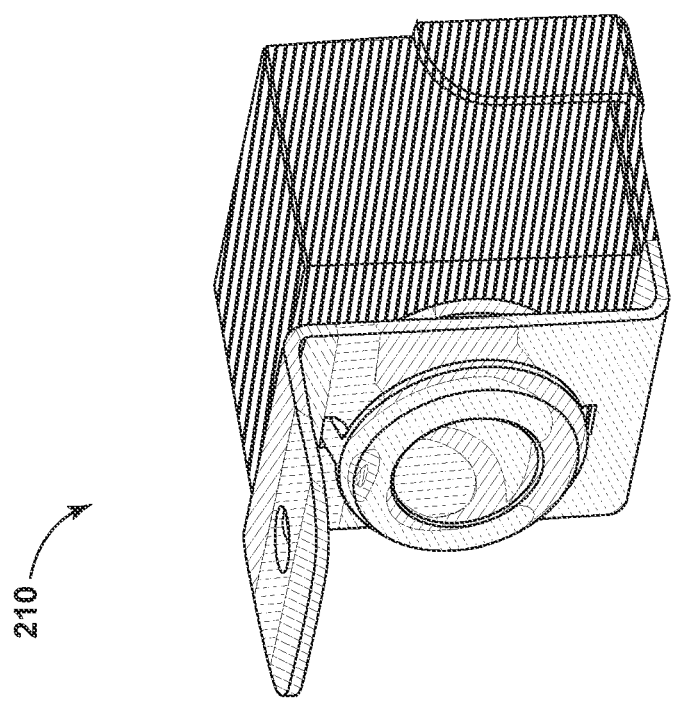
Figure 15D:
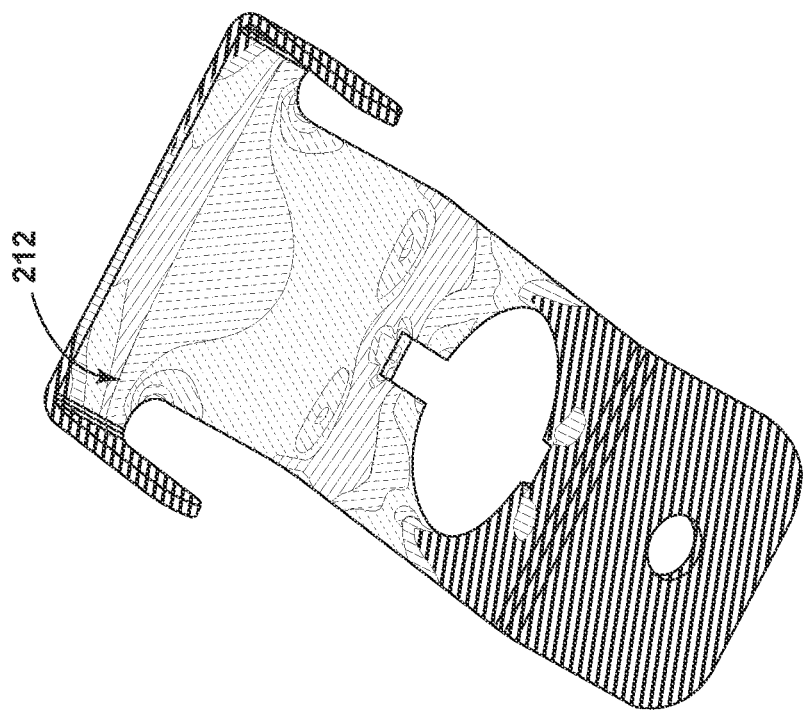
Figure 15C:
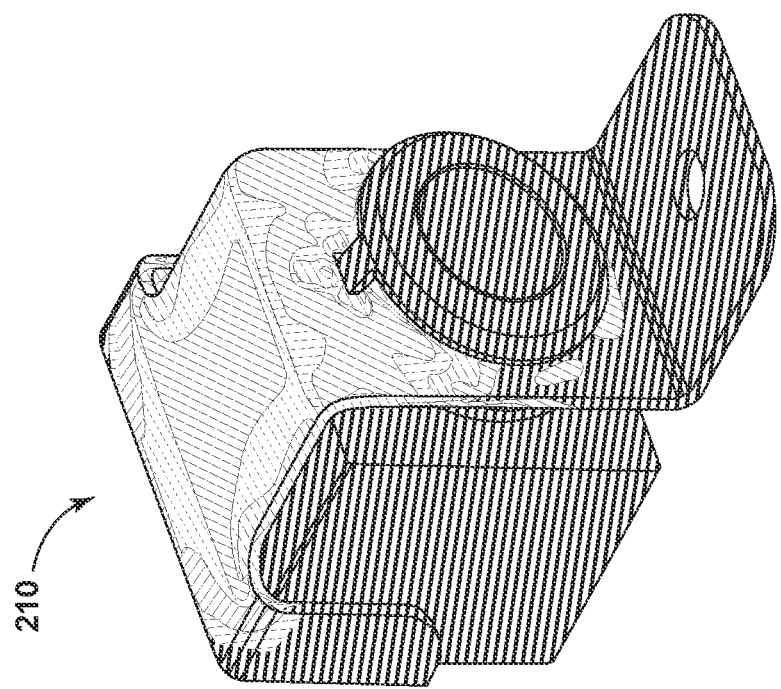
Figure 15F:
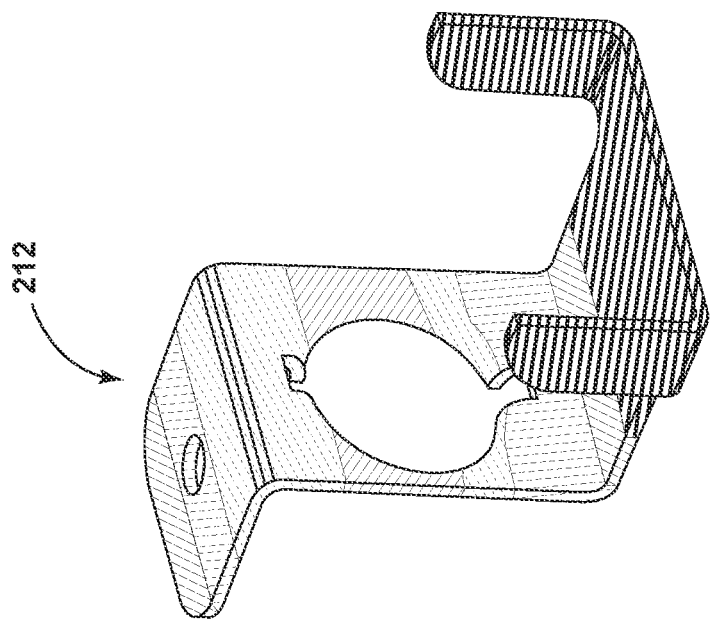
Figure 15E:
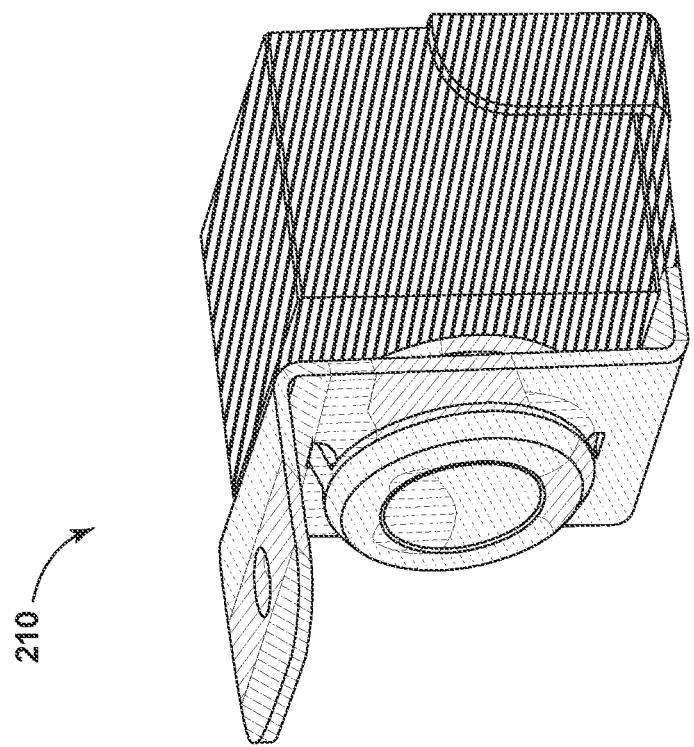
Figure 15H:
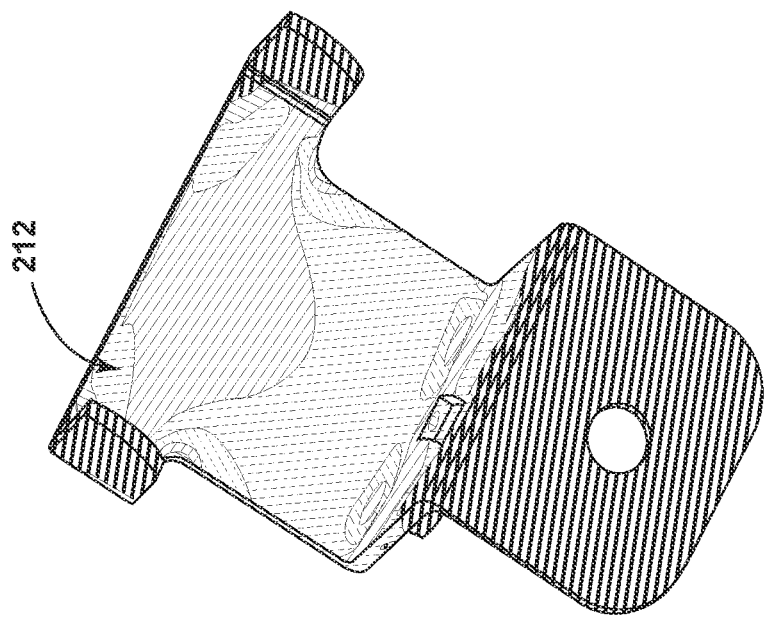
Figure 15G:
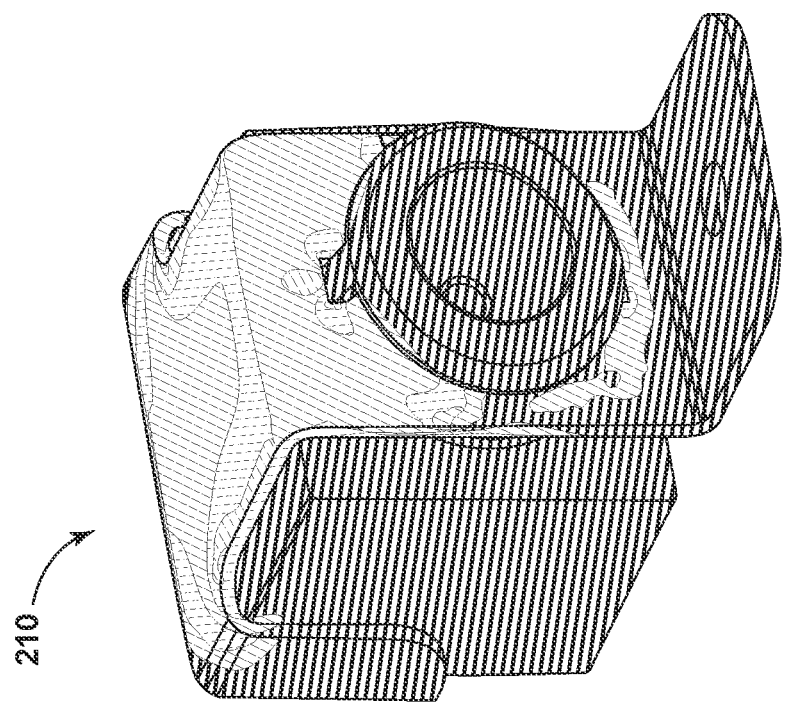
Figure 15J:
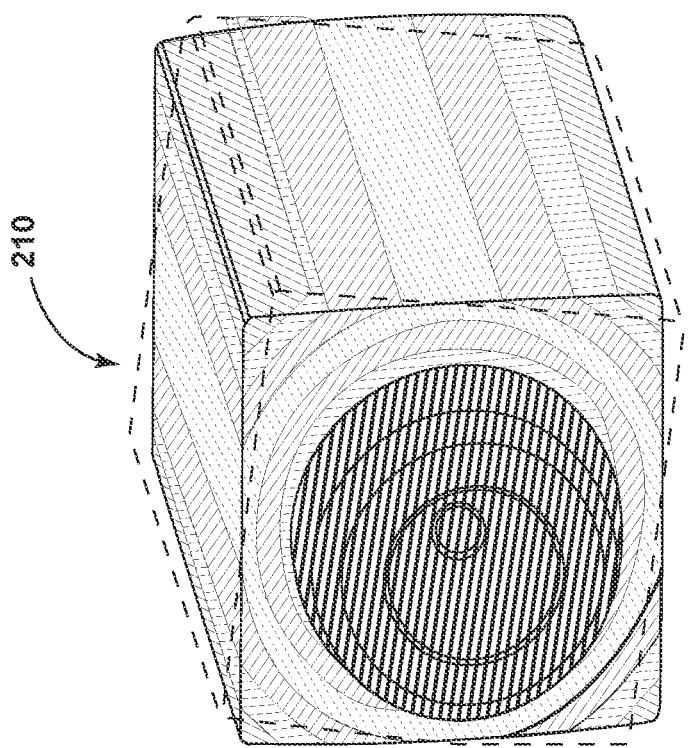
Figure 15I:
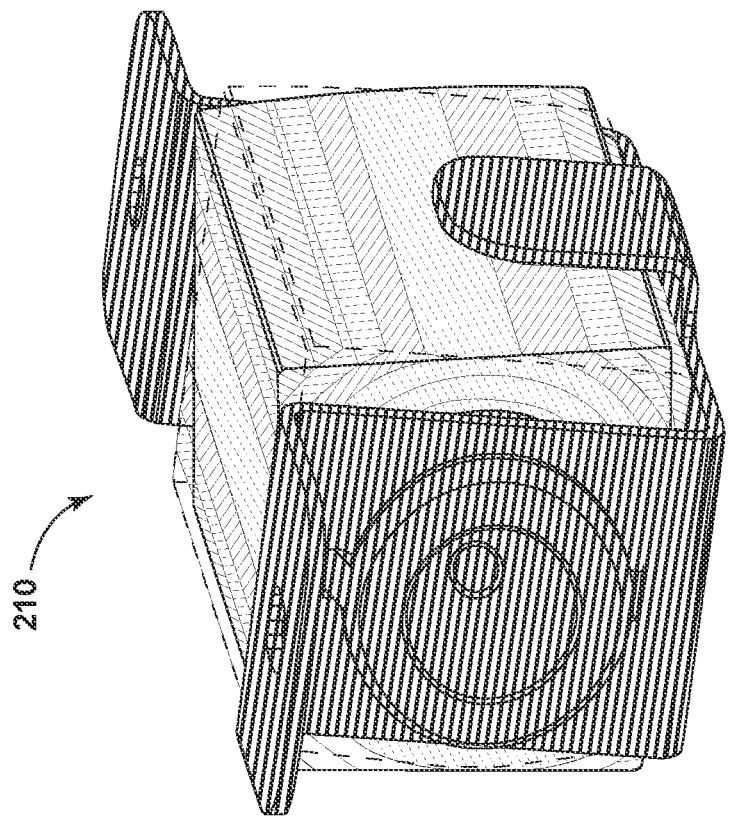
Figure 15L:
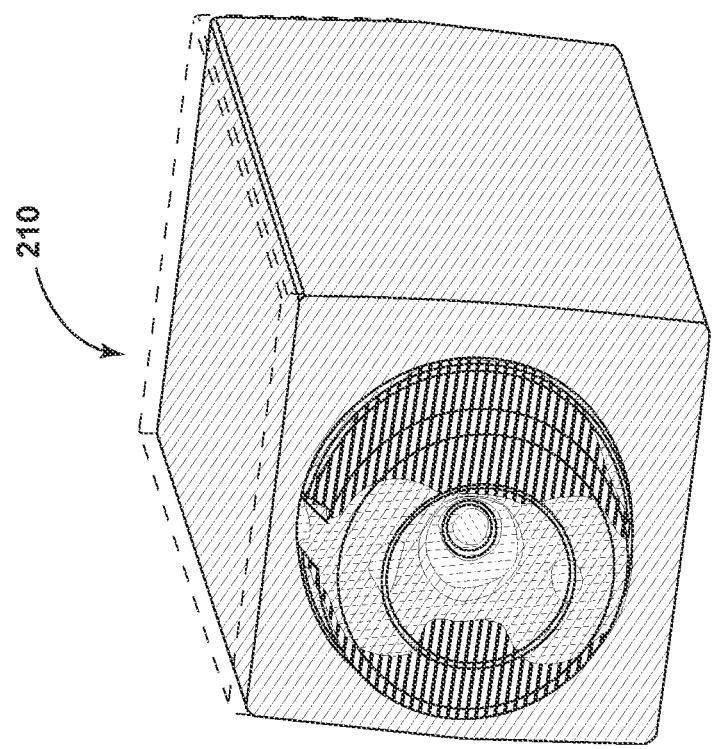
Figure 15K:
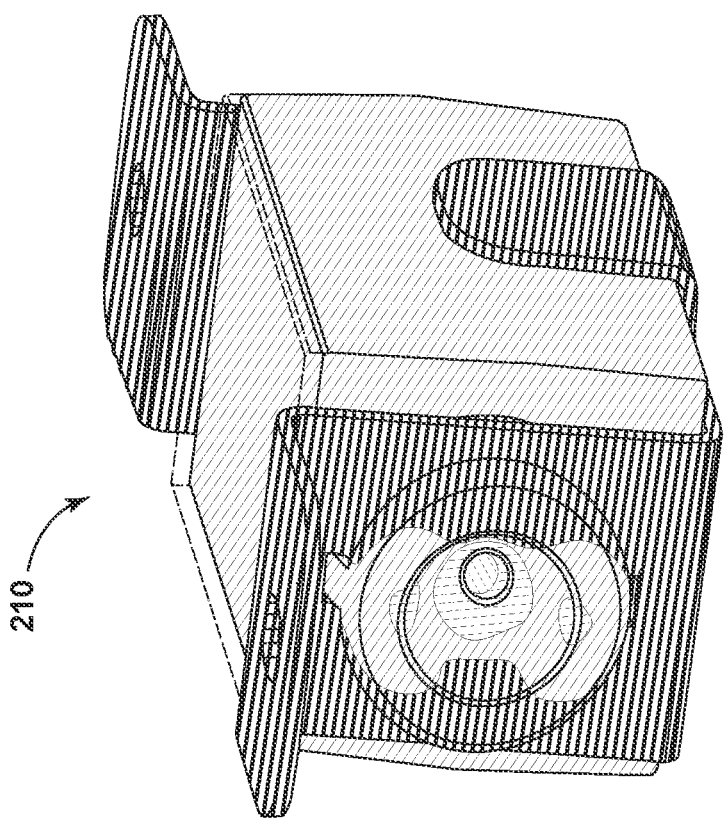
Figure 15N:
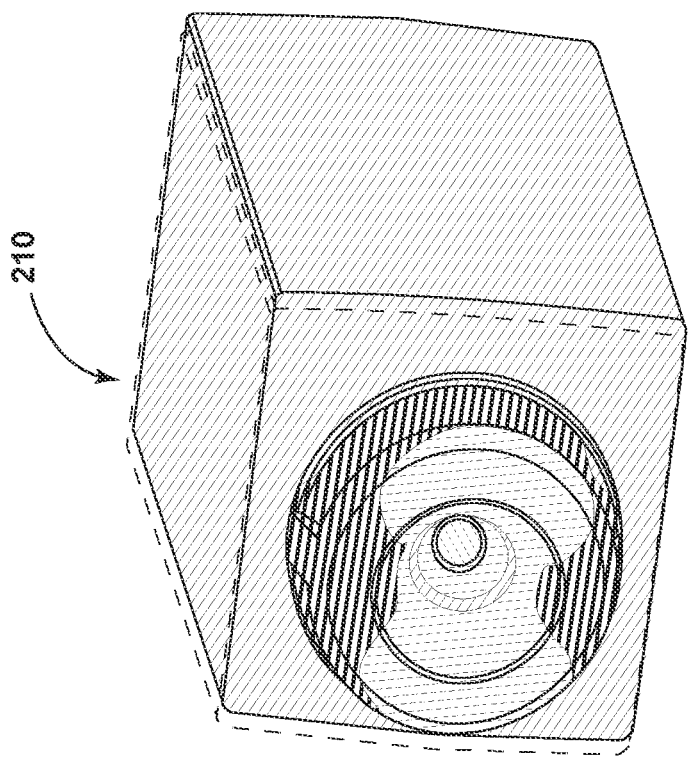
Figure 15M:
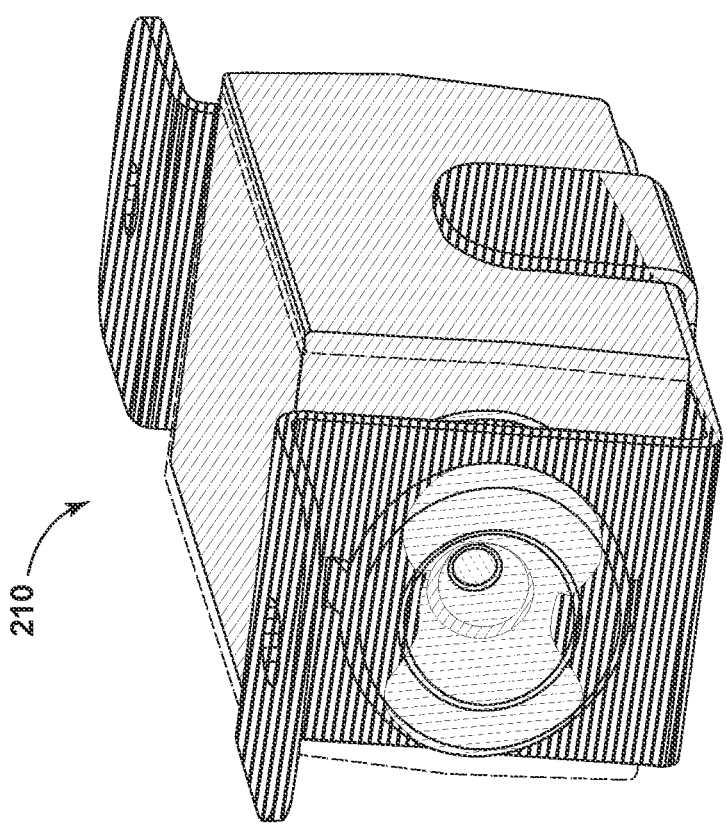
Figure 15P:
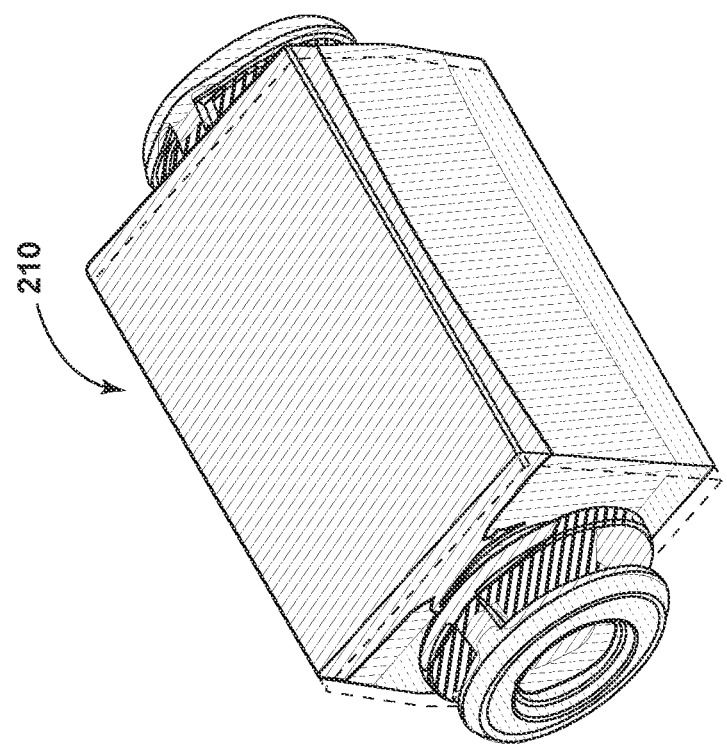
Figure 15O:
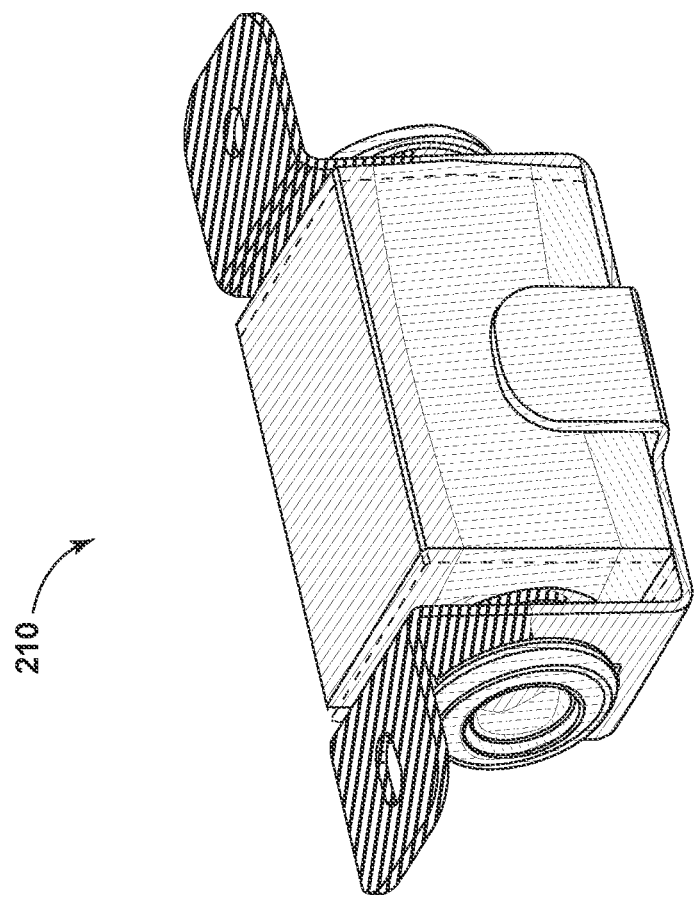
Figure 15R:
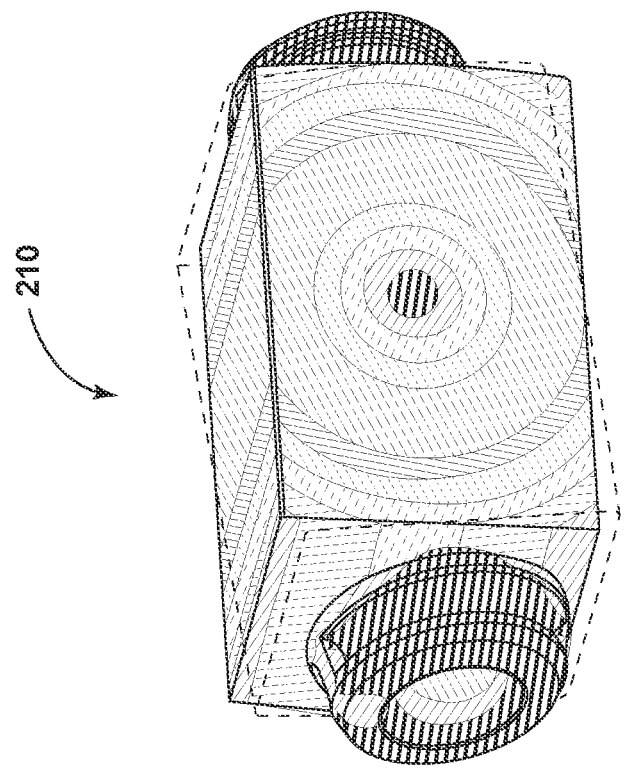
Figure 15Q:
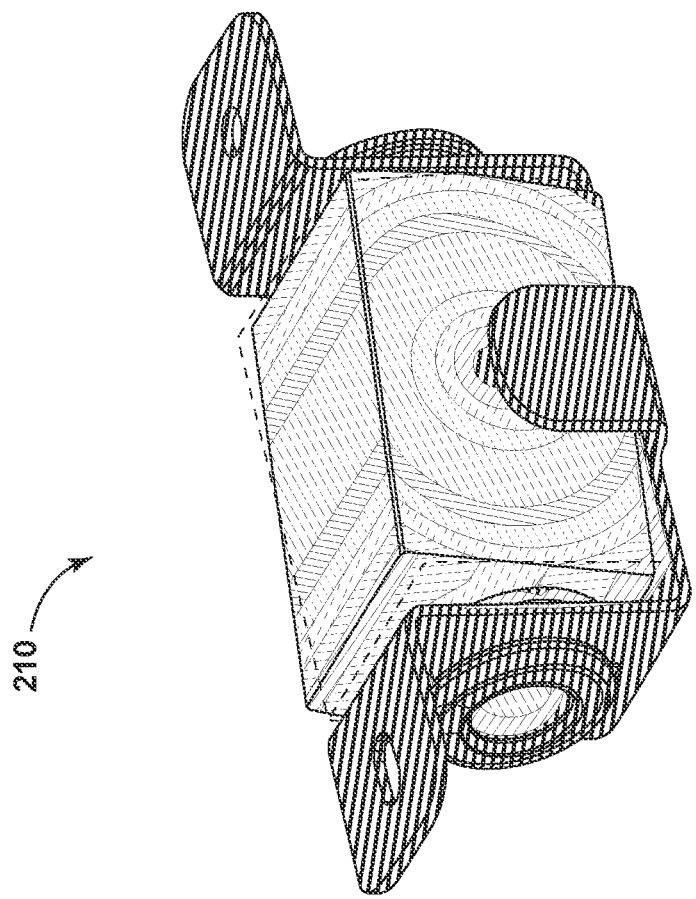
Figure 15T:
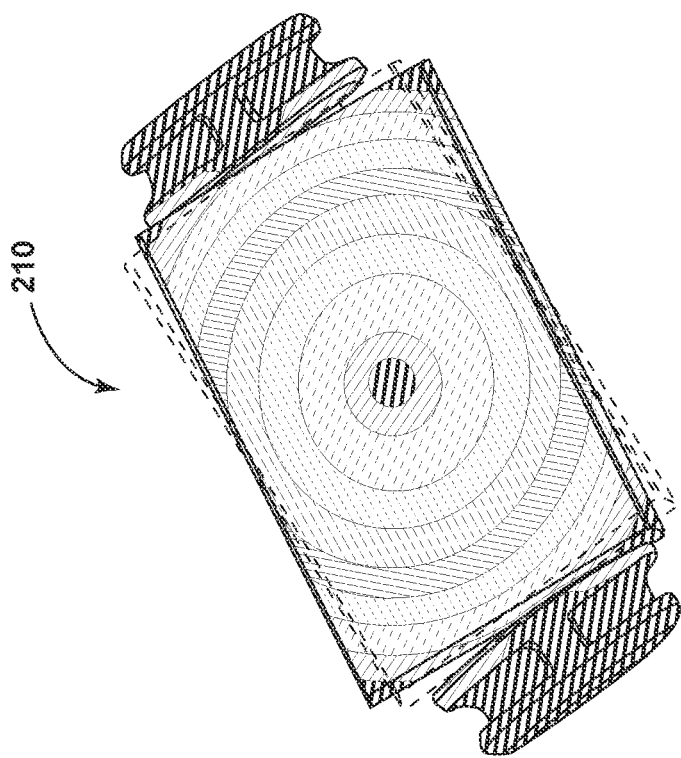
Figure 15S:
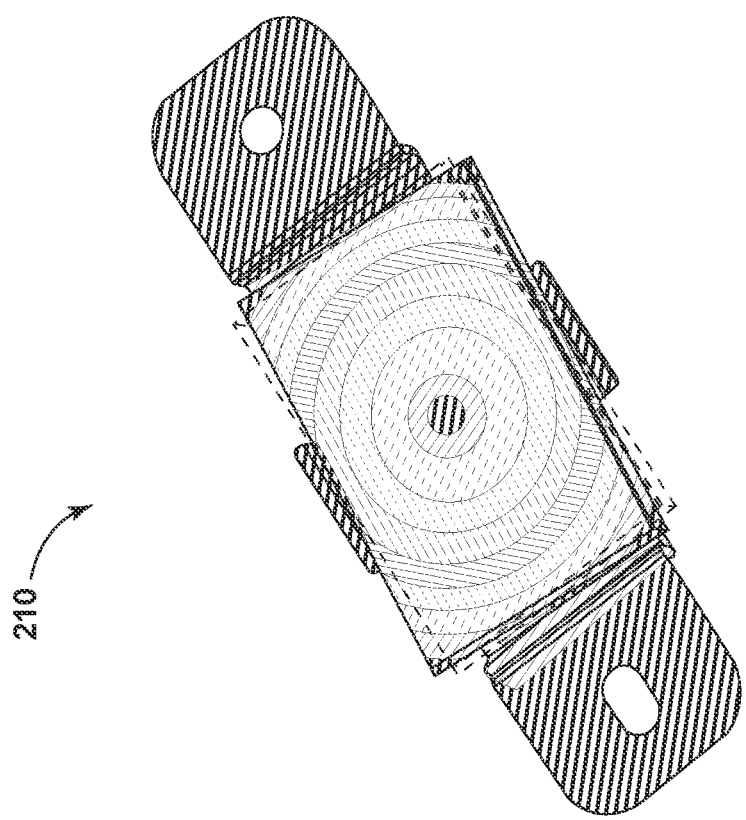

FIGS. 15A-15T includes FEA images of embodiments of isolator assemblies 210 and portions thereof.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. An isolator assembly, comprising:
a bracket having a base and a first tab and a second tab extending from opposite ends of the base, the first tab and the second tab each having an aperture;
a first isolator connected to the first tab and at least partially received in the aperture of the first tab;
a second isolator connected to the second tab and at least partially received in the aperture of the second tab;
a mass connected to the bracket via the first isolator and the second isolator;
a first pin connected to the first isolator, the first pin extending through the aperture of the first tab, and extending into a first recess of the mass; and
a second pin connected to the second isolator, the second pin extending through the aperture of the second tab, and extending into a second recess of the mass;
wherein the first isolator and the second isolator each includes a plurality of support members extending radially and connecting an inner portion and an outer portion, the outer portion is axially offset from the inner portion and an opening is provided circumferentially between successive support members; and, in a plan view, the base is perpendicular to the first tab and the second tab, and the base extends from the first tab to the second tab in a longitudinal direction parallel to a longitudinal axis between the apertures of the first and second tabs.

2. The isolator assembly of claim 1, wherein the first isolator and the second isolator each includes a first radial flange and a second radial flange.

3. The isolator assembly of claim 2, wherein the first radial flange and the second radial flange are axially spaced from each other; and an outer diameter of the first radial flange is larger than an outer diameter of the second radial flange.

4. The isolator assembly of claim 3, wherein a distance between the first radial flange and the second radial flange corresponds to a thickness of a respective one of the first tab or second tab of the bracket.

5. The isolator assembly of claim 2, wherein the second radial flange is configured for insertion into the aperture in a respective one of the first tab or the second tab of the bracket and to increase a removal force of the first isolator from the bracket; and the first radial flange is configured to limit an insertion depth of the first isolator into the aperture.

6. The isolator assembly of claim 5, wherein an outer diameter of the second radial flange is greater than an inner diameter of the aperture.

7. The isolator assembly of claim 5, wherein the aperture is offset from a center of the respective one of the first tab or the second tab.

8. The isolator assembly of claim 1, wherein the first isolator and the second isolator each include a plurality of legs extending axially from a surface of the respective first isolator and second isolator.

9. The isolator assembly of claim 8, wherein a number of support members of the plurality of support members is equal to a number of legs of the plurality of legs.

10. The isolator assembly of claim 8, wherein the inner portion extends axially beyond the outer portion toward the mass.

11. The isolator assembly of claim 8, wherein at least two legs of the plurality of legs include portions disposed at an inner surface of the outer portion.

12. The isolator assembly of claim 8, wherein the plurality of legs extend substantially in an axial direction toward the mass.

13. The isolator assembly of claim 1, wherein the plurality of support members that connect the inner portion and the outer portion comprise an elastomeric membrane.

14. The isolator assembly of claim 1, wherein the first isolator is formed separately from the mass.

15. The isolator assembly of claim 1, wherein a cross-sectional shape of the first isolator is substantially rectangular.

16. The isolator assembly of claim 15, wherein the first isolator includes a first side having a first length and a second side have a second length; the first length corresponds to a first frequency; the second length corresponds to a second frequency; and the first frequency and the second frequency are different.

17. A method of assembling an isolator assembly, comprising:
    providing a first isolator, a second isolator, a bracket, a first pin, a second pin, and a mass, the bracket having a base and a first tab and a second tab extending from opposite ends of the base, the first tab and the second tab each having an aperture, the first isolator and the second isolator each including a plurality of support members extending radially and connecting an inner portion and an outer portion, the outer portion is axially offset from the inner portion and an opening is provided circumferentially between successive support members;
    connecting the bracket with an assembly fixture;
    connecting the mass with the assembly fixture;
    connecting the first isolator with a press;
    connecting the second isolator with the press;
    inserting the first isolator into the aperture of the first tab and the second isolator into the aperture of the second tab via the press;
    inserting the first pin into the first isolator and a first end of the mass; and
    inserting the second pin into the second isolator and a second end of the mass;
    wherein, in a plan view, the base is perpendicular to the first tab and the second tab, and the base extends from the first tab to the second tab in a longitudinal direction parallel to a longitudinal axis between the apertures of the first and second tabs; the first pin is connected to the first isolator, the first pin extends through the aperture of the first tab, and the first pin extends into a first end of the mass; and the second pin is connected to the second isolator, the second pin extends through the aperture of the second tab, and the second pin extends into a second end of the mass.

18. The method of claim 17, wherein inserting the first isolator and the second isolator into respective apertures includes (i) inserting a first radial flange of the first isolator and a first radial flange of the second isolator into the respective apertures, and (ii) limiting insertion via a second radial flange of the first isolator and a second radial flange of the second isolator; and, after inserting the first isolator and the second isolator into the respective apertures, a first portion of the bracket is disposed partially between the first radial flange and the second radial flange of the first isolator, and a second portion of the bracket is disposed partially between the first radial flange and the second radial flange of the second isolator.

19. An isolator assembly, comprising:
    a bracket including a base and a first tab and a second tab extending from opposite ends of the base, the first tab and the second tab each having an aperture;
    a first isolator connected to the bracket;
    a second isolator connected to the bracket; and
    a mass connected to the bracket via the first isolator and the second isolator;
    wherein the first isolator and the second isolator are integrally formed with the mass; the first isolator includes a radial flange; an outer diameter of the radial flange is larger than an inner diameter of the aperture of the first tab; and the first isolator and the second isolator each includes a plurality of support members extending radially and connecting an inner portion and an outer portion, the outer portion is axially offset from the inner portion and an opening is provided circumferentially between successive support members; and, in a plan view, the base is perpendicular to the first tab and the second tab, and the base extends from the first tab to the second tab in a longitudinal direction parallel to a longitudinal axis between the apertures of the first and second tabs; and the diameter of at least one of the aperture of the first tab and the aperture of the second tab is greatest at an axial end and includes an internal taper toward a center of the bracket and/or toward the mass.

* * * * *